(12) United States Patent
Kawamura et al.

(10) Patent No.: US 9,235,037 B2
(45) Date of Patent: Jan. 12, 2016

(54) ZOOM LENS AND IMAGE PICKUP APPARATUS USING THE SAME

(71) Applicants: Olympus Corporation, Tokyo (JP); Olympus Imaging Corp., Tokyo (JP)

(72) Inventors: Kazuteru Kawamura, Tokyo (JP); Akiko Naito, Tokyo (JP); Keitaro Yokoyama, Tokyo (JP); Toshio Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/309,468

(22) Filed: Jun. 19, 2014

(65) Prior Publication Data

US 2014/0375870 A1    Dec. 25, 2014

(30) Foreign Application Priority Data

Jun. 21, 2013    (JP) ................................. 2013-130898

(51) Int. Cl.
*G02B 15/14* (2006.01)
*G02B 15/177* (2006.01)

(52) U.S. Cl.
CPC .................................... *G02B 15/177* (2013.01)

(58) Field of Classification Search
CPC .................................................. G02B 15/177
USPC ................. 359/644, 645, 660, 686, 689, 695, 359/715–716, 770, 781, 784
See application file for complete search history.

(56) References Cited

U.S. PATENT DOCUMENTS

| | | | |
|---|---|---|---|
| 8,446,512 B2 | 5/2013 | Ichikawa et al. | |
| 8,649,107 B2 | 2/2014 | Hosoi et al. | |
| 2012/0057068 A1 | 3/2012 | Ichikawa et al. | |
| 2012/0162779 A1 | 6/2012 | Imaoka | |
| 2012/0212833 A1 | 8/2012 | Hosoi et al. | |
| 2012/0250161 A1* | 10/2012 | Yanai | G02B 15/177 359/682 |

FOREIGN PATENT DOCUMENTS

| | | |
|---|---|---|
| JP | 2008-232611 | 10/2008 |
| JP | 2012-058406 | 3/2012 |
| JP | 2012-133230 | 7/2012 |
| JP | 2012-173298 | 9/2012 |

* cited by examiner

*Primary Examiner* — Scott J Sugarman
*Assistant Examiner* — Vipin Patel
(74) *Attorney, Agent, or Firm* — Kenyon & Kenyon LLP

(57) ABSTRACT

A zoom lens includes in order from an object side to an image side, a first lens unit having a negative refractive power, a second lens unit having a positive refractive power, and a third lens unit having a negative refractive power. At the time of zooming, distances between the lens units change, and a distance between the first lens unit and the second lens unit at a telephoto end is shorter than a distance between the first lens unit and the second lens unit at a wide angle end, and an aperture stop is disposed on an image side of an image-side surface of the first lens unit, and on an object side of an image-side surface of the second lens unit, and the zoom lens satisfies the conditional expressions.

34 Claims, 19 Drawing Sheets

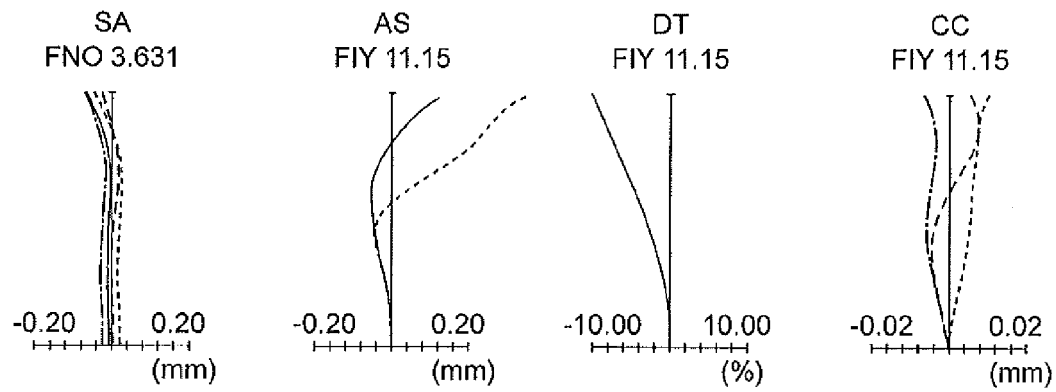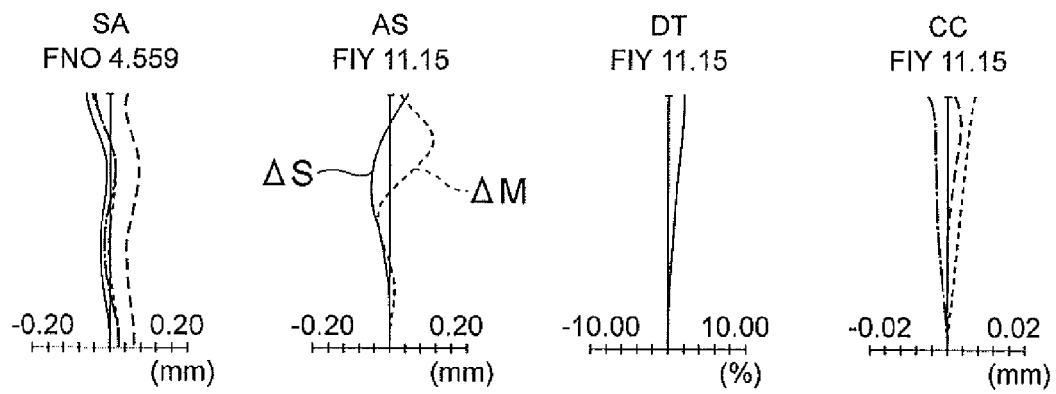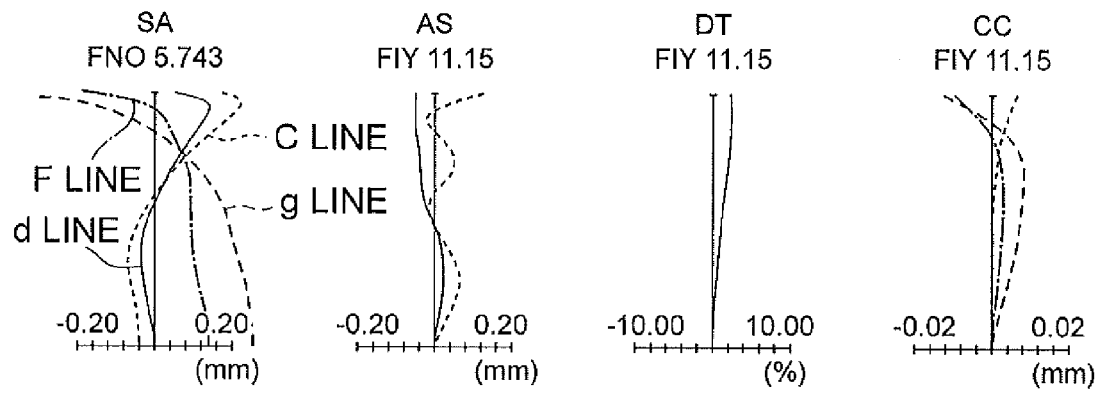

SA
FNO 3.623

-0.20    0.20
(mm)

AS
FIY 11.15

-0.20    0.20
(mm)

DT
FIY 11.15

-10.00   10.00
(%)

CC
FIY 11.15

-0.02    0.02
(mm)

SA
FNO 4.468

-0.20    0.20
(mm)

AS
FIY 11.15

-0.20    0.20
(mm)

DT
FIY 11.15

-10.00   10.00
(%)

CC
FIY 11.15

-0.02    0.02
(mm)

SA
FNO 5.736

-0.20    0.20
(mm)

AS
FIY 11.15

-0.20    0.20
(mm)

DT
FIY 11.15

-10.00   10.00
(%)

CC
FIY 11.15

-0.02    0.02
(mm)

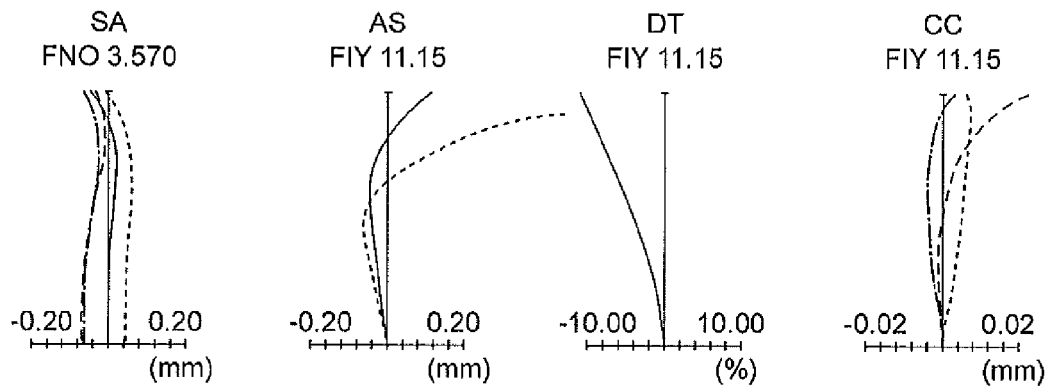
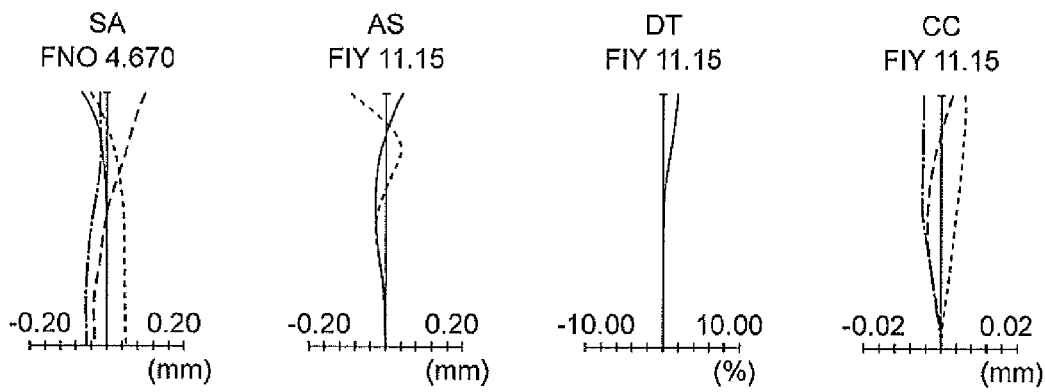
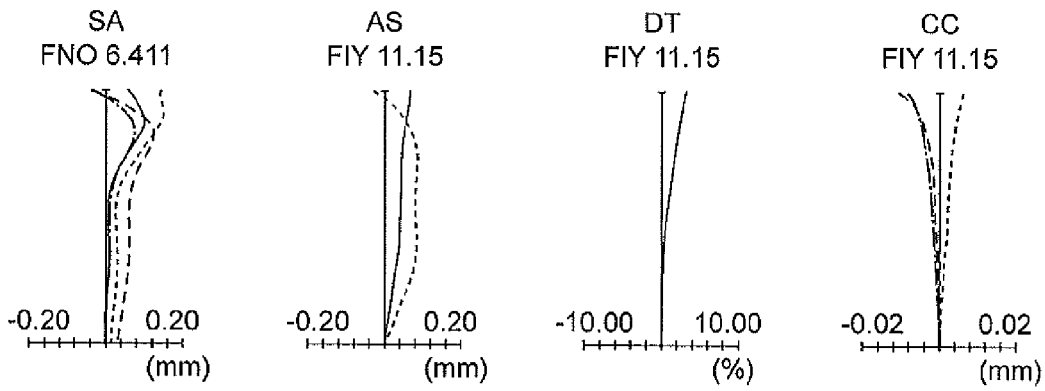

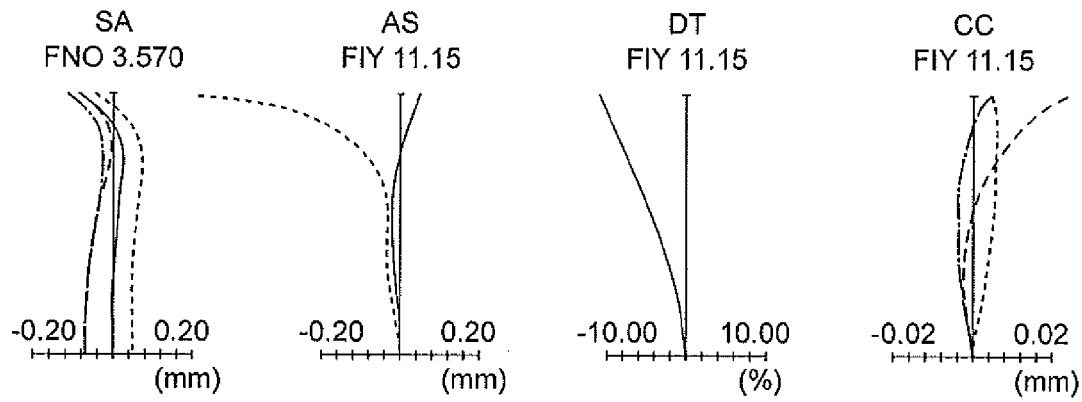
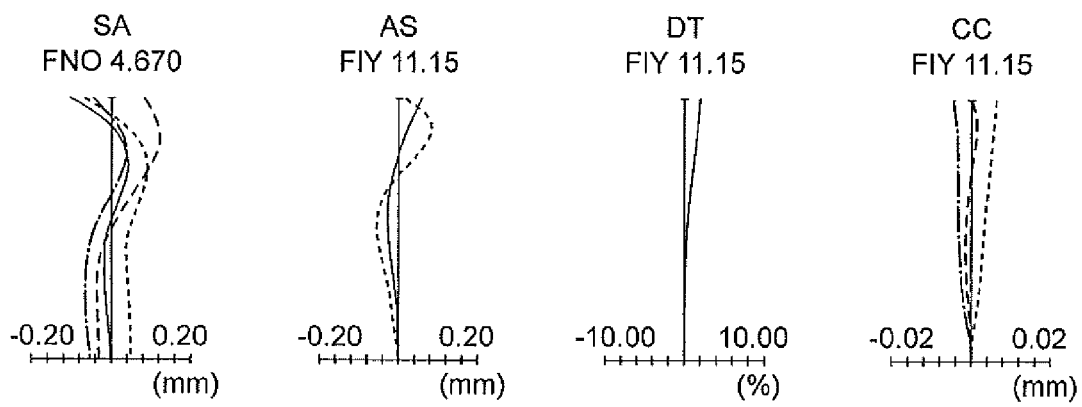
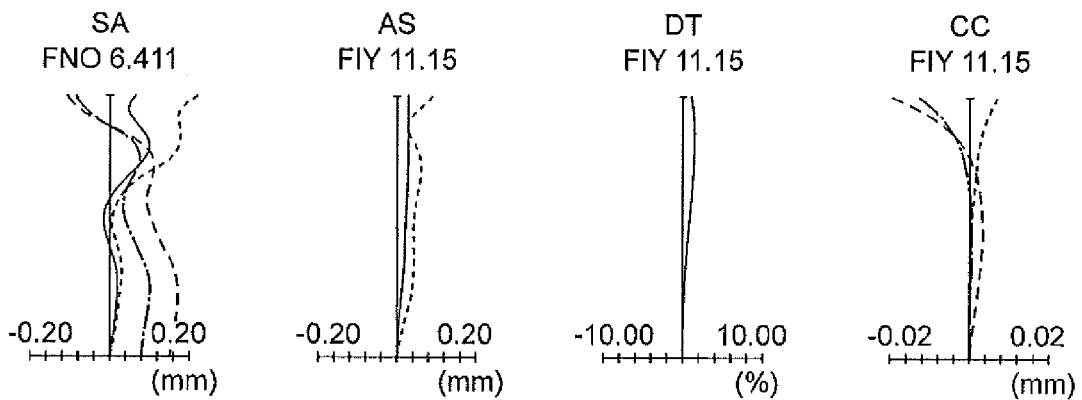

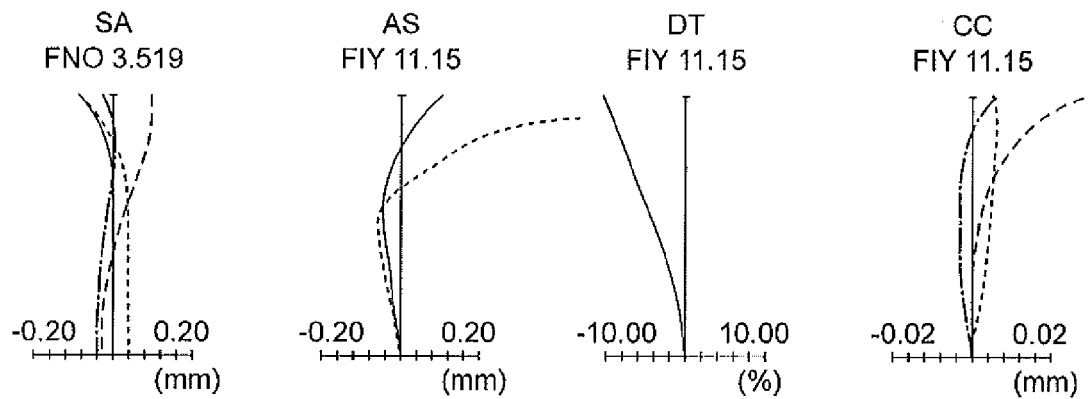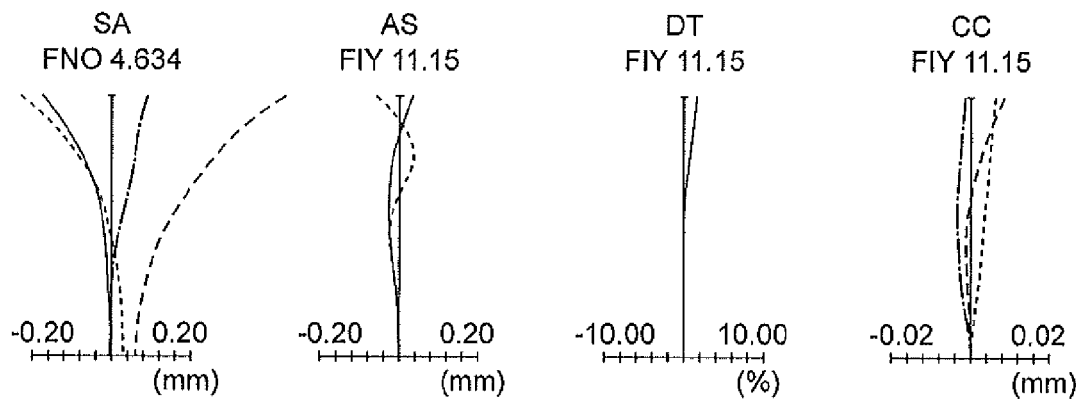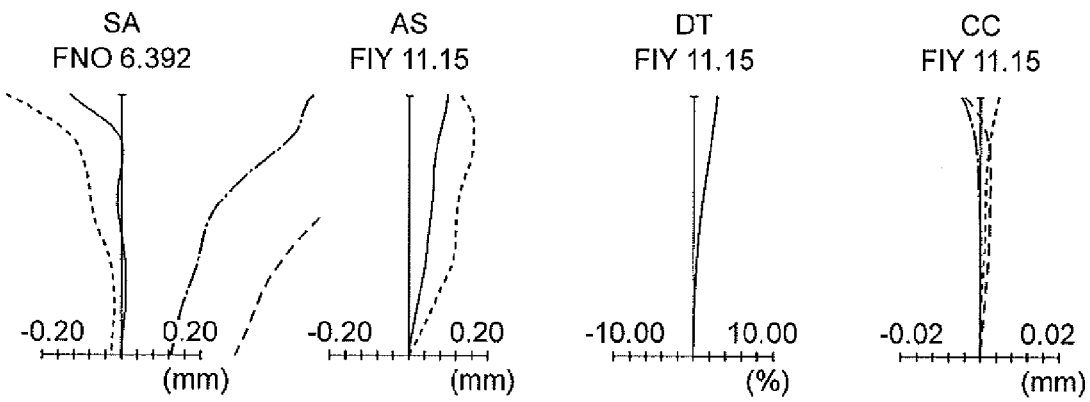

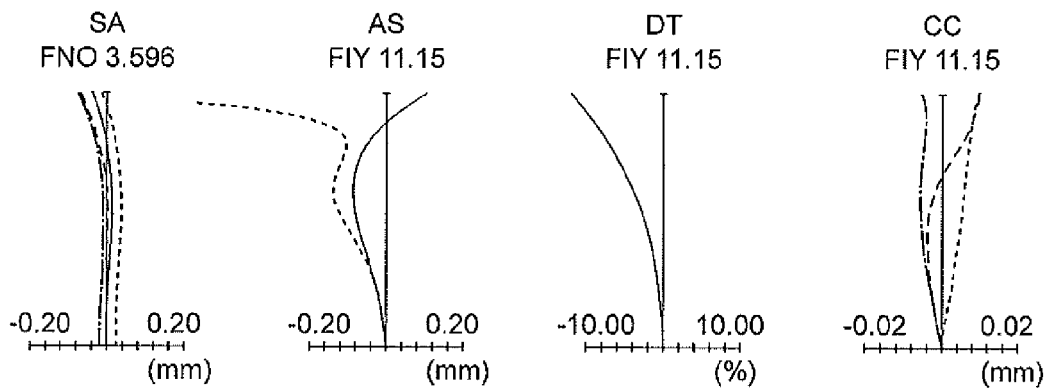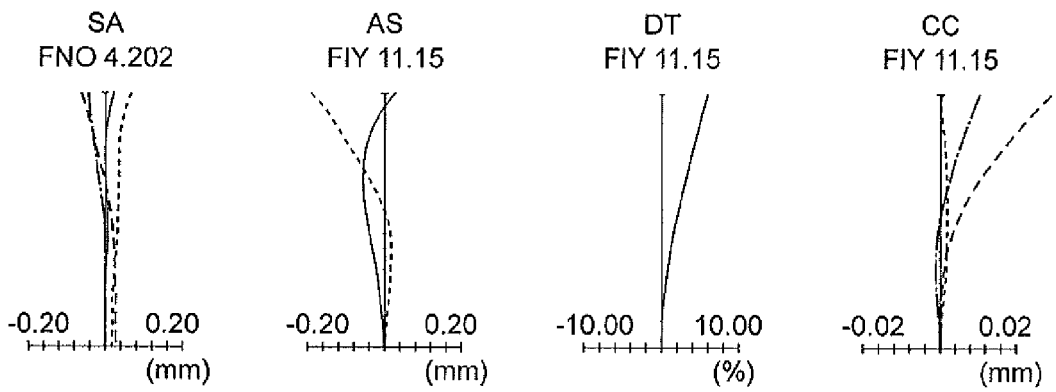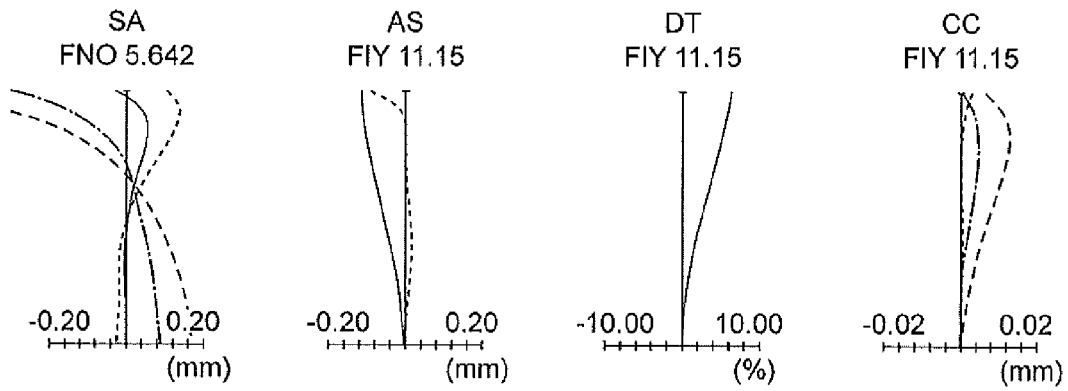

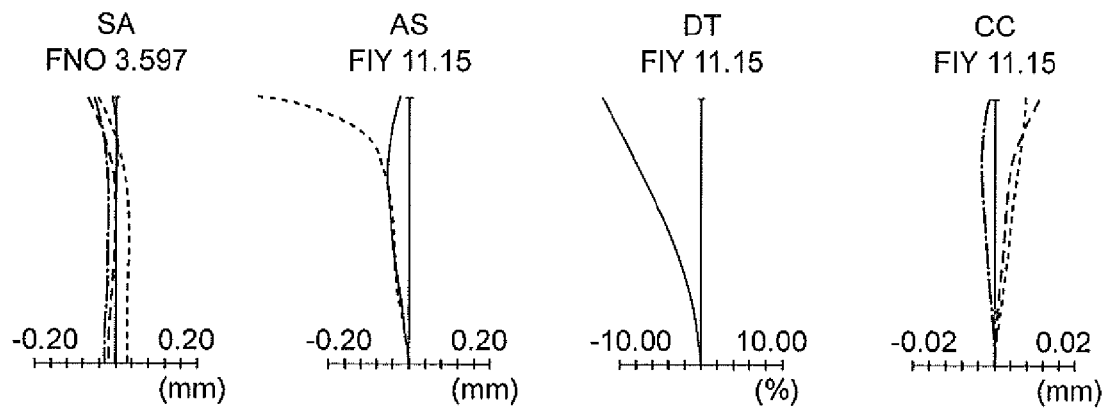
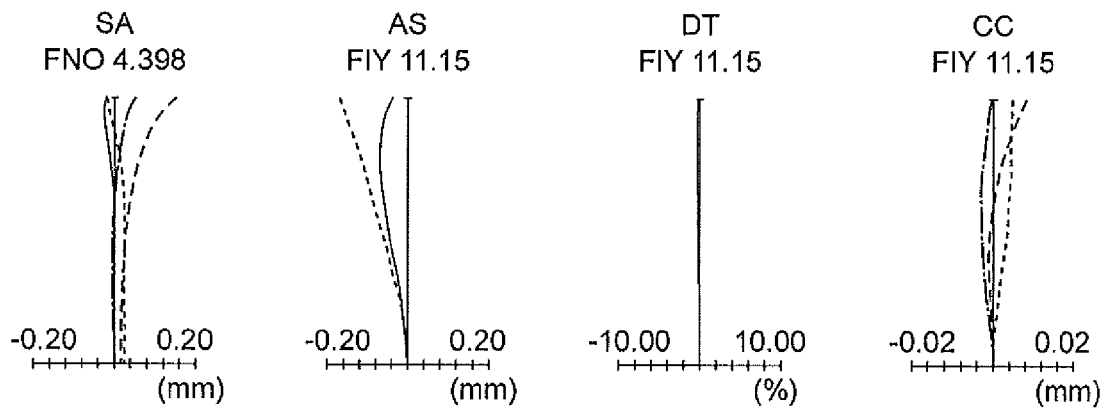
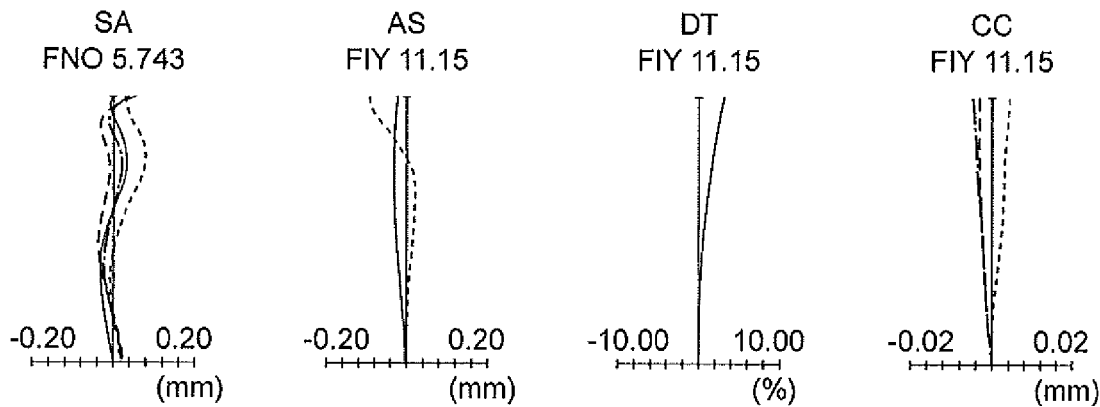

ZOOM LENS AND IMAGE PICKUP APPARATUS USING THE SAME

CROSS-REFERENCE TO RELATED APPLICATION

The present invention is based upon and claims the benefit of priority from the prior Japanese Patent Application No. 2013-130898 filed on Jun. 21, 2013; the entire contents of which are incorporated herein by reference.

BACKGROUND OF THE INVENTION

1. Field of the Invention

The present invention relates to a zoom lens and an image pickup apparatus using the same.

2. Description of the Related Art

In cameras, according to an application and need, the number of pixels is increased by making large an image pickup surface area of an image pickup element, thereby facilitating an improvement in an image quality, and conversely, by making small the image pickup area, small-sizing of overall camera is carried out. Here, various types of optical systems are used in cameras, and one of these optical systems includes a zoom lens. The zoom lens is also used in an interchangeable lens (lens that is detachable from a camera main-body).

If the image pickup surface area is large, an image (of an object) formed on the image pickup surface also becomes large. Therefore, in a camera in which, the image pickup surface area is large, the zoom lens is susceptible to become large. Therefore, a zoom lens for the camera with the large image pickup surface area is sought to have both, a favorable optical performance and a favorable portability. In other words, in a zoom lens, it is sought that an aberration from a center of an image to a periphery has been corrected favorably, and that the zoom lens has a small size. Both the favorable optical performance and the favorable portability have also been sought in a zoom lens for a camera with a small image pickup surface area.

Zoom lenses fulfilling these requirements are disclosed in Japanese Patent Application Laid-open Publication Nos. 2012-133230 and 2012-58406. The zoom lens in Japanese Patent Application Laid-open Publication No. 2012-133230 and the zoom lens in Japanese Patent Application Laid-open Publication No. 2012-58406, include in order from an object side, a lens unit having a negative refractive power, a lens unit having a positive refractive power, a lens unit having a negative refractive power, and a lens unit having a positive refractive power. The zoom lens in Japanese Patent Application Laid-open Publication No. 2012-133230 and the zoom lens in Japanese Patent Application Laid-open Publication No. 2012-58406 are comparatively small-sized and have a wide angle of view at a wide angle end.

SUMMARY OF THE INVENTION

A zoom lens according to the present invention includes in order from an object side to an image side a first lens unit having a negative refractive power, a second lens unit having a positive refractive power, and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on an image side of a image-side surface of the first lens unit, and on an object side of an image-side surface of the second lens unit, and the zoom lens satisfies the following conditional expressions (1), (2), and (3)

$$0.83 < IH_{MAX}/f_W < 1.2 \quad (1)$$

$$-20.0\% < DT_W < -6.0\% \quad (2)$$

$$0.35 < |f_3/ER_S| < 1.05 \quad (3)$$

where, $IH_{MAX}$ denotes the maximum image height, and denotes the maximum value in a case in which, the maximum image height changes with zooming, $f_W$ denotes a focal length of the overall zoom lens system at the time of infinite object point focusing at the wide angle end, $$DT_W = \{IH_W - f_W \times \tan(\omega_W)\}/\{f_W \times \tan(\omega_W)\} \times 100(\%),$$

$f_W$ denotes the focal length of the overall zoom lens system at the time of infinite object point focusing at the wide angle end, $IH_W$ denotes the maximum image height at the time of infinite object point focusing at the wide angle end, $\omega_W$ denotes a half angle of view at the time of infinite object point focusing at the wide angle end, $f_3$ denotes a focal length of the third lens unit, and $ER_S$ denotes the maximum radius of an opening portion of the aperture stop.

Another zoom lens according to the present invention includes in order from an object side to an image side a first lens unit having a negative refractive power, a second lens unit having a positive refractive power, and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the zoom lens satisfies the following conditional expressions (1) and (2).

$$0.83 < IH_{MAX}/f_W < 1.2 \quad (1)$$

$$-20.0\% < DT_W < -6.0\% \quad (2)$$

where, $IH_{MAX}$ denotes the maximum image height, and denotes the maximum value in a case in which, the maximum image height changes with zooming, $f_W$ denotes a focal length of the overall zoom lens system at the time of infinite object point focusing at the wide angle end, $$DT_W = \{IH_W - f_W \times \tan(\omega_W)\}/\{f_W \times \tan(\omega_W)\} \times 100(\%),$$

$IH_W$ denotes the maximum image height at the time of infinite object point focusing at the wide angle end, and $\omega_W$ denotes a half angle of view at the time of infinite object point focusing at the wide angle end.

Still another zoom lens according to the present invention includes in order from an object side to an image side a first lens unit having a negative refractive power,
a second lens unit having a positive refractive power,
a third lens unit having a negative refractive power, and
a fourth lens unit having a positive refractive power, which is disposed on the image side of the third lens unit, wherein at the time of zooming, distances between the lens units change, and a distance between the first lens unit and the second lens unit at a telephoto end is shorter than a distance between the first lens unit and the second lens unit at a wide angle end, and a distance between the third lens unit and the fourth lens unit widens at the telephoto end with respect to a distance between the third lens unit and the fourth lens unit at the wide angle end, and an aperture stop is disposed on the image side of an image-side surface of the first lens unit, and on the object side of an image-side surface of the second lens unit, and the second lens unit includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path, of the lens component make a contact with air, and the zoom lens satisfies the following conditional expressions (1) and (4).

$$0.83 < IH_{MAX}/f_W < 1.2 \tag{1}$$

$$1.5 < f_{UN21}/ER_S < 3.7 \tag{4}$$

where, $IH_{MAX}$ denotes the maximum image height, and denotes the maximum value in a case in which, the maximum image height changes with zooming, $f_W$ denotes a focal length of the overall zoom lens system at the time of infinite object point focusing at the wide angle end, $ER_S$ denotes the maximum radius of an opening portion of the aperture stop, and $f_{UN21}$ denotes a focal length of the object-side sub lens unit in the second lens unit.

Still another zoom lens according to the present invention includes in order from an object side to an image side a first lens unit having a negative refractive power,
a second lens unit having a positive refractive power,
a third lens unit having a negative refractive power, and
a fourth lens unit having a positive refractive power, which is disposed on the image side of the third lens unit, and at the time of zooming, distances between the lens units change, and a distance between the first lens unit and the second lens unit at a telephoto end is shorter than a distance between the first lens unit and the second lens unit at a wide angle end, and a distance between the third lens unit and the fourth lens unit widens at the telephoto end with respect to a distance between the third lens unit and the fourth lens unit at the wide angle end, and an aperture stop is disposed on the image side of an image-side surface of the first lens unit, and on the object side of an image-side surface of the second lens unit, and the second lens units includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path, of the lens component make a contact with air, and the image-side sub lens unit in the second lens unit includes a lens surface having a negative refractive power and a positive lens which is disposed on the image side of the lens surface, and the first lens unit includes in order from the object side to the image side, an object-side sub lens unit which includes a first negative lens, and an image-side sub lens unit which includes a second negative lens and a first positive lens, and the zoom lens satisfies the following conditional expressions (5) and (6).

$$0.6 < f_{UN21}/f_2 < 1.6 \tag{5}$$

$$1.15 < |f_3/f_w| < 2.5 \tag{6}$$

where, $f_{UN21}$ denotes a focal length of the object-side sub lens unit in the second lens unit, $f_2$ denotes a focal length of the second lens unit, $f_3$ denotes a focal length of the third lens unit, and $f_w$ denotes a focal length of the overall zoom lens system at the time of infinite object point focusing at the wide angle end.

Still another zoom lens according to the present invention includes in order from an object side to an image side a first lens unit having a negative refractive power,
a second lens unit having a positive refractive power,
a third lens unit having a negative refractive power, and
a fourth lens unit having a positive refractive power, which is disposed on the image side of the third lens unit, and at the time of zooming, distances between the lens units change, and a distance between the first lens unit and the second lens unit at a telephoto end is shorter than a distance between the first lens unit and the second lens unit at a wide angle end, and a distance between the third lens unit and the fourth lens unit widens at the telephoto end with respect to a distance between the third lens unit and the fourth lens unit at the wide angle end, and an aperture stop is disposed on the image side of an image-side surface of the first lens unit, and on the object side of an image-side surface of the second lens unit, and the second lens unit includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path, of the lens component make a contact with air, and the image-side sub lens unit in the second lens unit includes a lens surface having a negative refractive power, and a positive lens which is disposed on the image side of the lens surface, and the first lens unit includes in order from the object side to the image side, an object-side sub lens unit which includes a first negative lens, and an image-side sub lens unit which includes a second negative lens and a first positive lens, and the zoom lens satisfies the following conditional expressions (5) and (7).

$$0.6 < f_{UN21}/f_2 < 1.6 \quad (5)$$

$$1.6 < |f_3/IH_{39w}| < 3.9 \quad (7)$$

where, $f_{UN21}$ denotes a focal length of the object-side sub lens unit in the second lens unit, $f_2$ denotes a focal length of the second lens unit, $f_3$ denotes a focal length of the third lens unit, and $IH_{39w}$ denotes a distance from an optical axis, of a position at which a principal light ray for which, a half angle of field on an incidence side of the zoom lens at the time of focusing at infinity on an optical axis at the wide angle end becomes 39°, intersects with a paraxial image plane.

Moreover, an image pickup apparatus according to the present invention includes a zoom lens, and an image pickup element which has an image pickup surface, and which converts an image formed on the image pickup surface by the zoom lens, to an electric signal, where the zoom lens is one of the abovementioned zoom lenses.

BRIEF DESCRIPTION OF THE DRAWINGS

FIG. 1A is a lens cross-sectional view at a wide angle end, FIG. 1B is a lens cross-sectional view in an intermediate focal length state, and FIG. 1C is a lens cross-sectional view at a telephoto end;

FIG. 2A is a lens cross-sectional view at a wide angle end, FIG. 2B is a lens cross-sectional view in an intermediate focal length state, and FIG. 2C is a lens cross-sectional view at a telephoto end;

FIG. 3A is a lens cross-sectional view at a wide angle end, FIG. 3B is a lens cross-sectional view in an intermediate focal length state, and FIG. 3C is a lens cross-sectional view at a telephoto end;

FIG. 4A is a lens cross-sectional view at a wide angle end, FIG. 4B is a lens cross-sectional view in an intermediate focal length state, and FIG. 4C is a lens cross-sectional view at a telephoto end;

FIG. 5A is a lens cross-sectional view at a wide angle end, FIG. 5B is a lens cross-sectional view in an intermediate focal length state, and FIG. 5C is a lens cross-sectional view at a telephoto end;

FIG. 6A is a lens cross-sectional view at a wide angle end, FIG. 6B is a lens cross-sectional view in an intermediate focal length state, and FIG. 6C is a lens cross-sectional view at a telephoto end;

FIG. 7A is a lens cross-sectional view at a wide angle end, FIG. 7B is a lens cross-sectional view in an intermediate focal length state, and FIG. 7C is a lens cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens according to the example 1;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens according to the example 3;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the zoom lens according to the example 4;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the zoom lens according to the example 5;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of infinite object point focusing of the zoom lens according to the example 6;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the zoom lens according to the example 7;

DETAILED DESCRIPTION OF THE INVENTION

Figure 1A:
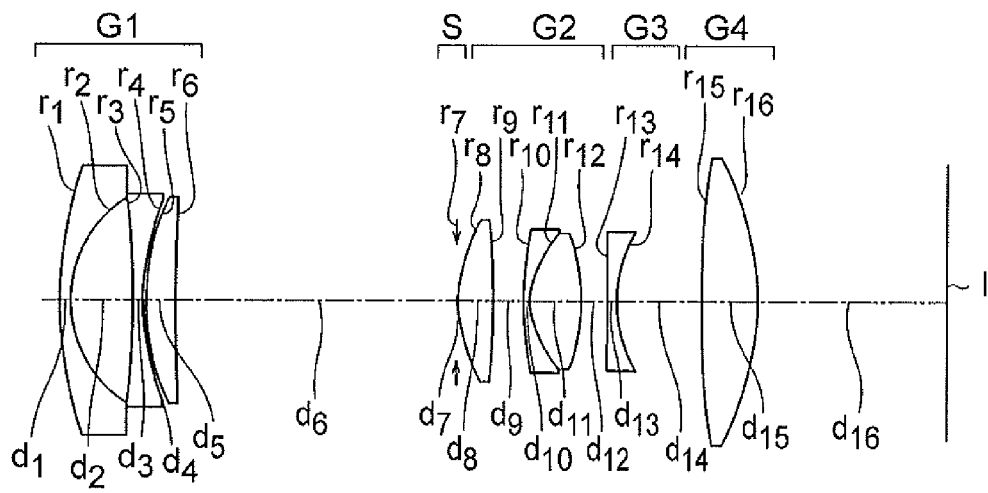
FIG. 1A, FIG. 1B, and FIG. 1C are lens cross-sectional views at the time of infinite object point focusing of a zoom lens according to an example 1 of the present invention, where.

Exemplary embodiments and examples of a zoom lens and an image pickup apparatus using the same, according to the present invention will be described below by referring to the accompanying diagrams. However, the present invention is not restricted to the embodiments and examples described below.

In the present patent application, a half angle of view surpassing 39 degrees and an angle of view surpassing 41 degrees at a wide angle end have been secured, and the overall length is shortened and a zooming ratio more than 2.8 times has been achieved. In order to achieve such specifications, the total number of lenses in each lens unit is reduced to be small so that it does not become a constraint on the total length of lenses, and the total thickness of each lens unit is let to be small, and an arrangement is let to be close to a symmetrical system as an optical system from the wide angle end to a telephoto end.

An arrangement in common of the zoom lens according to the present embodiment will be described below.

The zoom lens includes in order from an object side to an image side, a first lens unit having a negative refractive power,
a second lens unit having a positive refractive power, and
a third lens unit having negative refractive power, and
at the time of zooming from a wide angle end to a telephoto end, distances between the lens units change, and
a distance between the first lens unit and the second lens unit at the telephoto end is shorter than a distance between the first lens unit and the second lens unit at the wide angle end, and
an aperture stop is disposed on an image side of an image-side surface of the first lens unit, and on an object side of an image-side surface of the second lens unit.

By making such an arrangement, it becomes easy to adopt an arrangement such that the refractive power arrangement becomes asymmetrical arrangement with the second lens unit near the aperture stop at the center, throughout the total zoom range. Therefore, even if the overall length of the zoom lens at the wide angle end is shortened by decreasing the number of lenses, it is possible to suppress degradation of various aberrations caused due to decrease in the number of lenses. In such manner, in the basic arrangement, small-sizing of the optical system and securing a stable optical performance throughout the total zoom range are facilitated. The stable optical performance means that the occurrence of various aberrations and fluctuation thereof are suppressed sufficiently.

Moreover, in the zoom lens according to the present embodiment, it is preferable that the zoom lens satisfies the following conditional expression (1).

$$0.83 < IH_{MAX}/f_W < 1.2 \tag{1}$$

where, $IH_{MAX}$ denotes the maximum image height, and denotes the maximum value in a case in which, the maximum image height changes with zooming, and $f_W$ denotes a focal length of the overall zoom lens system at the time of infinite object point focusing at the wide angle end.

By making an arrangement such that a value does not fall below a lower limit value of conditional expression (1), it becomes easy to secure an angle of view at the wide angle end.

Moreover, by making an arrangement such that an upper limit value of conditional expression (1) is not exceeded, both, small-sizing of the zoom lens in a radial direction and a small-sizing of the overall length of the zoom lens are achieved. Moreover, it becomes easy to make a focal length at the telephoto end long. Accordingly, a moderate zooming ratio is secured.

Moreover, in the zoom lens according to the present embodiment, it is preferable that the zoom lens satisfies the following conditional expression (2).

$$-20.0\% < DT_W < -6.0\% \tag{2}$$

where, $DT_W = \{IH_W - f_W \times \tan(\omega_W)\}/\{f_W \times \tan(\omega_W)\} \times 100(\%)$, $IH_W$ denotes the maximum image height at the time of infinite object point focusing at the wide angle end, $f_W$ denotes the focal length of the overall zoom lens system at the time of infinite object point focusing at the wide angle end, and $\omega_W$ denotes a half angle of view at the time of infinite object point focusing at the wide angle end.

It is preferable to reduce a distortion of an image by making an arrangement such that a value does not fall below a lower limit value of conditional expression (2). Moreover, in a case in which, the distortion at the wide angle end has been corrected electrically, it is possible to suppress degradation of resolution at the periphery of a corrected image.

Making an arrangement such that an upper limit value of conditional expression (2) is not exceeded contributes to a correction of an astigmatism and small-sizing of the first lens unit.

Moreover, in the zoom lens according to the present embodiment, it is preferable that the zoom lens satisfies the following conditional expression (3).

$$0.35 < |f_3/ER_S| < 1.05 \tag{3}$$

where, $f_3$ denotes a focal length of the third lens unit, and $ER_S$ denotes the maximum radius of an opening portion of the aperture stop.

By making an arrangement such that a value does not fall below a lower limit value of conditional expression (3), and an upper limit value of conditional expression (3) is not exceeded, a balance of symmetry of the refractive power of the zoom lens becomes favorable. Favorable balance of symmetry of refractive power contributes to correction of a spherical aberration and a curvature of field. As a result, it contributes to securing a stable optical performance throughout the total zoom range, while securing an angle of view at the wide angle end.

Moreover, in the zoom lens according to the present embodiment, with the abovementioned common arrangement, it is preferable that the first lens unit includes in order from the object side to the image side, an object-side sub lens unit which includes a first negative lens, and an image-side sub lens unit which includes a second negative lens and a first positive lens.

Enhancing the negative refractive power of the first negative lens contributes to bringing an entrance pupil closer to the object side, and securing the angle of view at the wide angle end, and small-sizing. However, the astigmatism near the wide angle end, and the spherical aberration and a coma aberration near the telephoto end are susceptible to occur. By letting the image-side lens units have the abovementioned arrangement, aberrations in the overall first lens unit are suppressed, and stable optical performance is achieved throughout the total zoom range.

Moreover, it is preferable that the zoom lens according to the present embodiment, with the abovementioned common arrangement, includes a fourth lens unit having a positive refractive power, disposed on the image side of the third lens unit, and at the time of zooming from the wide angle end to the telephoto end, a distance between the third lens unit and the fourth lens unit changes.

Accordingly, an optical system in which, the third lens unit having a negative refractive power and the fourth lens unit having a positive refractive power are combined, becomes a magnifying optical system which magnifies an image formed at a lens system on the object side thereof. Accordingly, a diameter of the first lens unit is made small. Moreover, it becomes easy to move an exit pupil away from an image pickup surface, which contributes to improve an image quality.

Furthermore, by letting a lens surface nearest to the object side in the fourth lens unit to be a concave surface and a lens surface nearest to the image side in the fourth lens unit to be a convex surface, it is possible to suppress the curvature of field and the distortion, and it contributes to securing a favorable performance throughout the total zoom range.

Furthermore, widening of the distance between the third lens unit and the fourth length unit at the telephoto end with respect to the distance between the third lens unit and the fourth lens unit at the wide angle end, contributes to securing zooming ratio. Letting the fourth lens unit to be stationary at the time of zooming from the wide angle end to the telephoto end contributes to noise reduction when the zoom lens is operated. Accordingly, it is easy to simplify the arrangement, and it contributes to small-sizing.

Moreover, in the zoom lens according to the present embodiment, with the abovementioned common arrangement, it is preferable that the second lens unit includes an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path of the lens component make a contact with air.

Accordingly, the second lens unit which is positioned near the aperture stop is involved largely in the spherical aberration and the coma aberration. By letting the arrangement to be the abovementioned arrangement, the spherical aberration and the coma aberration are negated due to the object-side sub lens unit and the image-side sub lens unit, and it is possible to let an arrangement that enables to correct the aberrations favorably. Moreover, by securing an air space between the two sub lens units, an effect of correction of astigmatism is achieved.

Moreover, it is preferable the zoom lens according to the present embodiment satisfies the following conditional expression (4).

$$1.5 < f_{UN21}/ER_S < 3.7 \qquad (4)$$

where, $ER_S$ denotes the maximum radius of an opening portion of the aperture stop, and $f_{UN21}$ denotes a focal length of the object-side sub lens unit in the second lens unit.

By making an arrangement such that a value does not fall below a lower limit value of conditional expression (4), an occurrence of the spherical aberration and the coma aberration in the object-side sub lens unit in the second lens unit is suppressed. Accordingly, it becomes easy to negate the spherical aberration and the coma aberration in the image-side lens unit, thereby contributing to an improvement in performance.

By making an arrangement such that an upper limit value of conditional expression (4) is not surpassed, it becomes easy to enhance the positive refractive power of the second lens unit, and it contributes to shortening the overall length.

Moreover, it is preferable that the image-side sub lens unit in the second lens unit includes a lens surface having a negative refractive power, and a positive lens which is disposed on the image side of the lens surface.

Accordingly, it is possible to improve further the symmetry of refractive power arrangement of the zoom lens. Accordingly, the optical performance is improved throughout the total zoom range.

Moreover, it is preferable that the zoom lens according to the present embodiment satisfies the following conditional expression (5).

$$0.6 < f_{UN21}/f_2 < 1.6 \qquad (5)$$

where, $f_{UN21}$ denotes a focal length of the object-side sub lens unit in the second lens unit, and $f_2$ denotes a focal length of the second lens unit.

By making an arrangement such that a value does not fall below a lower limit value of conditional expression (5), the occurrence of the spherical aberration and the coma aberration in the object-side sub lens unit in the second lens unit is suppressed. Accordingly, it becomes easy to negate the spherical aberration and the coma aberration in the image-side sub lens unit, which contributes to improvement in the performance.

By making an arrangement such that an upper limit value of conditional expression (5) is not exceeded, it becomes easy to enhance the positive refractive power of the second lens unit, and contributes to shortening the overall length.

Moreover, it is preferable that the zoom lens according to the present embodiment satisfies the following conditional expression (6).

$$1.15 < |f_3/f_w| < 2.5 \qquad (6)$$

where, $f_3$ denotes a focal length of the third lens unit, and $f_W$ denotes a focal length of the overall zoom lens system at the time of infinite object point focusing at the wide angle end.

By making an arrangement such that a value does not fall below a lower limit value of conditional expression (6), and an upper limit value of conditional expression (6) is not exceeded, the balance of symmetry of the refractive power of the zoom lens becomes favorable, and it contributes to the correction of the spherical aberration and the curvature of field. Accordingly, it contributes to securing stable optical performance throughout the total zoom range while securing an angle of view at the wide angle end.

Moreover, it is preferable that the zoom lens according to the present embodiment satisfies the following conditional expression (7).

$$1.6 < |f_3/IH_{39w}| < 3.9 \qquad (7)$$

where, $f_3$ denotes a focal length of the third lens unit, and $IH_{39W}$ denotes a distance from an optical axis, of a position at which a principal light ray for which, a half angle of view on an incidence side of the zoom lens at the time of focusing at infinity on an optical axis at the wide angle end becomes 39°, intersects with a paraxial image plane.

Making an arrangement such that a value does not fall below a lower limit value of conditional expression (7) weakens the negative refractive power of the third lens unit moderately. This contributes to shortening of the overall length of the zoom lens.

By making an arrangement such that an upper limit value of conditional expression (7) is not exceeded, it is possible to secure an effect of correction of the spherical aberration and the coma aberration of the third lens unit sufficiently. Accordingly, it becomes easy to achieve a favorable optical performance throughout the total zoom range.

Moreover, it is preferable that the zoom lens according to the present embodiment is a four-unit zoom lens with the total number of lens units in the zoom lens four, namely, the first lens unit, the second lens unit, the third lens unit, and the fourth lens unit. Accordingly, it is easy to simplify the arrangement of the zoom lens, and it contributes to small-sizing.

Moreover, in the zoom lens according to the present embodiment, it is preferable that the object-side sub lens unit and the image-side sub lens unit in the second lens unit are disposed such that, an axial air space between the object-side sub lens unit and the image-side sub lens unit is the maximum in the second lens unit. This contributes to correction of aberration in the second lens unit.

Moreover, in the zoom lens according to the present embodiment, it is preferable that the image-side sub lens unit in the second lens unit includes one lens component, and only two surfaces of the lens component, namely, the object-side surface and the image-side surface, are in contact with air in the optical path, and the total number of lens components in the second lens units is two. Such an arrangement contributes to small-sizing of the second lens unit.

Moreover, it is preferable that the zoom lens according to the present embodiment satisfies the following conditional expression (8).

$$-1.5 < SF_{UN21} < 0.5 \quad (8)$$

where, $$SF_{UN21} = (R_{UN21O} + R_{UN21I})/(R_{UN21O} - R_{UN21I})$$

$R_{UN21O}$ denotes a paraxial radius of curvature of an object-side surface of the object-side sub lens unit in the second lens unit, and $R_{UN21I}$ denotes a paraxial radius of curvature of an image-side surface of the object-side sub lens unit in the second lens unit.

By making an arrangement such that a value does not fall below a lower limit value of conditional expression (8), it is possible to suppress the spherical aberration and the coma aberration susceptible to occur at a surface of incidence of the object-side sub lens unit in the second lens unit. Making such arrangement contributes to securing an optical performance near the telephoto end in particular.

By making an arrangement such that an upper limit value of conditional expression (8) is not exceeded, a principal point of the second lens unit is not let to be drawn excessively toward the image side, and securing the zooming ratio is made easier.

Moreover, it is preferable that the zoom lens according to the present embodiment satisfies the following conditional expression (9).

$$0.45 < \Sigma_{2G}/f_W < 1.1 \quad (9)$$

where, $\Sigma_{2G}$ denotes a thickness of the second lens unit on an optical axis, and $f_W$ denotes a focal length of the overall zoom lens system at the time of infinite object point focusing at the wide angle end.

By making an arrangement such that a value does not fall below a lower limit value of conditional expression (9), the curvature of field is reduced, and correction of the curvature of field throughout the total zoom range is made easy.

By making an arrangement such that an upper limit value of conditional expression (9) is not exceeded, a thickness of the second lens unit is made small, and small-sizing of the zoom lens when collapsed is carried out.

Moreover, it is preferable that the zoom lens according to the present embodiment satisfies the following conditional expression (10).

$$1.0 < |f_3/f_2| < 1.9 \quad (10)$$

where, $f_2$ denotes a focal length of the second lens unit, and $f_3$ denotes a focal length of the third lens unit.

By making an arrangement such that a value does not fall below a lower limit value of conditional expression (10), the negative refractive power of the third lens unit is weakened moderately. Such an arrangement contributes to shortening the overall length of the zoom lens.

By making an arrangement such that an upper limit value of conditional expression (10) is not exceeded, it is possible to secure the effect of correction of the spherical aberration and the coma aberration in the second lens unit sufficiently. Accordingly, it becomes easy to achieve favorable performance throughout the total zoom range of the zoom lens.

Moreover, it is preferable that the zoom lens according to the present embodiment satisfies the following conditional expression (11).

$$1.3 < |f_3/IH_{MAX}| < 2.5 \quad (11)$$

where, $f_3$ denotes the focal length of the third lens unit, and $IH_{MAX}$ denotes the maximum image height, and denotes the maximum value in a case in which, the maximum image height changes with zooming.

A technical significance of conditional expression (11) is same as the technical significance of conditional expression (10). Therefore, repetitive description thereof is omitted.

Moreover, in the zoom lens according to the present embodiment, it is preferable that the third lens unit includes a lens having a specific gravity more than 0.9 g/cm³ and smaller than 1.3 g/cm³.

It is possible to make the involvement of the third lens unit in zooming comparatively smaller. For this, it is preferable to carry out focusing by moving the third lens unit in an optical axial direction and to carry out reduction of image blur due to camera-shake and shifting movement of the lens unit. Moreover, by securing light weight and rigidity of the third lens unit by satisfying the condition of specific gravity, the focusing is carried out at a high-speed and a followability of the shifting movement of the lens unit with respect to the camera-shake is improved.

Moreover, in the zoom lens according to the present embodiment, it is preferable that the second lens unit includes a negative lens, and a positive lens that satisfies the following conditional expression (12).

$$63 < \nu_{p1} < 96 \quad (12)$$

where, $\nu_{p1}$ denotes Abbe's number for a d-line of one of the positive lenses in the second lens unit.

The second lens unit being close to the aperture stop, an effect of the spherical aberration for each color is large. For correction of a longitudinal chromatic aberration, it is preferable to make a dispersion by a lens having a positive refractive power small, and a dispersion by a lens having a negative refractive power large. However, the lens with a large dispersion also has a large abnormal dispersibility, and correction of the spherical aberration for each color becomes difficult. Therefore, by satisfying conditional expression (12), it is possible to correct these aberrations favorably.

By making an arrangement such that a value does not fall below a lower limit value of conditional expression (12), the abnormal dispersibility of the negative lens is suppressed relatively, and it contributes to correction of a chromatic aberration.

By letting the dispersion to be such that an upper limit value of conditional expression (12) is not exceeded, it is possible to reduce the abnormal dispersibility of the positive lens, and it contributes to the correction of the chromatic aberration.

Moreover, in the zoom lens according to the present embodiment, it is preferable that the second negative lens in the first lens unit satisfies the following conditional expression (13).

$$-0.9 < SF_{2N} < 1.5 \tag{13}$$

where, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

By making an arrangement such that a value does not fall below a lower limit value of conditional expression (13), an object-side surface of the second negative lens is not let to be drawn excessively toward the first negative lens at an edge. Accordingly, a distance between the first negative lens and the second negative lens is made small, and it contributes to small-sizing of the first lens unit.

By making an arrangement such that an upper limit value of conditional expression (13) is not exceeded, it becomes easy to achieve a sufficient effect of correction of astigmatism on the object-side surface of the second negative lens.

Moreover, it is preferable that the zoom lens according to the present embodiment satisfies the following conditional expression (14).

$$0.6 < fb_W/IH_{MAX} < 1.8 \tag{14}$$

where, $fb_W$ denotes an air-converted back-focus at the time of infinite object point focusing at the wide angle end, and $IH_{MAX}$ denotes the maximum image height, and denotes the maximum value in a case in which, the maximum image height changes with zooming.

By drawing the overall zoom lens away from an image plane by making an arrangement such that a value does not fall below a lower limit value of conditional expression (14), it becomes easy to draw the exit pupil away from the image plane. Accordingly, it becomes easy to suppress a fluctuation in an angle of incidence of light ray incident on the image plane, and it becomes easy to guide sufficient amount of light to a peripheral area of the image.

Making an arrangement such that an upper limit value of conditional expression (14) is not exceeded contributes to shortening of the overall length of the zoom lens at the time of using, and widening of the angle of view at the wide angle end.

Moreover, it is preferable that the zoom lens according to the present embodiment satisfies the following conditional expression (15).

$$0.4 < f_1/f_3 < 1.2 \tag{15}$$

where, $f_1$ denotes a focal length of the first lens unit, and
$f_3$ denotes a focal length of the third lens unit.

By making an arrangement such that a value does not fall below a lower limit value of conditional expression (15), the negative refractive power of the first lens unit is suppressed, and no large negative distortion is let to occur even when the small-sizing is carried out.

By making an arrangement such that an upper limit value of conditional expression (15) is not exceeded, the negative refractive power of the third lens unit is suppressed, and no large positive distortion is let to occur even when the small-sizing is carried out.

Moreover, it becomes easy to reduce an occurrence of the chromatic aberration of magnification due to the third lens unit, and it contributes to reduction of the number of lenses in the third lens unit and small-sizing of the third lens unit.

Moreover, it is preferable that the zoom lens according to the present embodiment satisfies the following conditional expression (16).

$$0.45 < \Sigma_{2G}/f_2 < 0.75 \tag{16}$$

where, $\Sigma_{2G}$ denotes a thickness on an optical axis of the second lens unit, and $f_2$ denotes a focal length of the second lens unit.

By making an arrangement such that a value does not fall below a lower limit value of conditional expression (16), it becomes easy to suppress an over-tendency of the curvature of field. Accordingly, the curvature of field can be easily suppressed throughout the total zoom range. Moreover, securing sufficient positive refractive power of the second lens unit becomes easy, and it contributes to small-sizing of the overall length of the zoom lens.

Making an arrangement such that an upper limit value of conditional expression (16) is not exceeded suppresses the thickness of the second lens unit and contributes to small-sizing.

Moreover, it is preferable that the zoom lens according to the present embodiment satisfies the following conditional expression (17).

$$3 < LTL_W/fb_W < 13 \tag{17}$$

where, $LTL_W$ denotes a sum of a distance on an optical axis from a refracting surface of the zoom lens nearest to the object side and a refracting surface of the zoom lens nearest to the image side, of the zoom lens at the time of infinite object point focusing at the wide angle end, and an air-converted back focus, and $fb_W$ denotes the air-converted back focus of the zoom lens at the time of infinite object point focusing on the optical axis at the wide angle end.

By making an arrangement such that a value does not fall below a lower limit value of conditional expression (17), it is made easy to secure a variable space for securing the zooming ratio more than 2.8 times.

By making an arrangement such that an upper limit value of conditional expression (17) is not exceeded, shortening of the overall length of the zoom lens is carried out. Moreover, in a casein which, the zoom lens is used for an interchangeable lens, back focus is secured such that there is no interference with a camera main-body.

Moreover, it is preferable that the zoom lens according to the present embodiment satisfies the following conditional expression (18).

$$0.8 < f_{UN21}/f_W < 1.7 \tag{18}$$

where, $f_{UN21}$ denotes a focal length of the object-side sub lens unit in the second lens unit, and $f_W$ denotes a focal length of the overall zoom lens system at the time of infinite object point focusing at the wide angle end.

A technical significance of conditional expression (18) is same as the technical significance of conditional expression (5). Therefore, repetitive description thereof is omitted.

Moreover, it is preferable that the zoom lens according to the present embodiment satisfies the following conditional expression (19).

$$0.4 < \Delta D_{12}/f_T < 0.6 \qquad (19)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, and $f_T$ denotes a focal length of the overall zoom lens system at the time of infinite object point focusing at the telephoto end.

Conditional expression (19) is an expression which specifies a favorable amount of a change in the distance between the first lens unit and the second lens unit for small-sizing.

By making an arrangement such that a value does not fall below a lower limit value of conditional expression (19), in a case in which, zooming ratio of 2.8 times or more for instance is taken into consideration, the refractive power of the first lens unit and the refractive power of the second lens unit are suppressed, and it is possible to reduce a change in the spherical aberration and a change in the curvature of field at the time of zooming even while suppressing the number of lenses in the first lens unit and the number of lenses in the second lens unit. Moreover, it contributes also to small sizing in a case of accommodating the zoom lens by collapsing.

Making an arrangement such that an upper limit value of conditional expression (19) is not exceeded contributes to shortening of the overall length of the zoom lens.

Moreover, it is preferable that the zoom lens according to the present embodiment satisfies the following conditional expression (20).

$$0.73 < IH_{39W}/f_W < 0.77 \qquad (20)$$

where, $IH_{39W}$ denotes a distance from an optical axis, of a position at which a principal light ray for which, a half angle of view on an incidence side of the zoom lens at the time of focusing at infinity on an optical axis at the wide angle end becomes 39°, intersects with a paraxial image plane, and $f_W$ denotes a focal length of the overall zoom lens at the time of infinite object point focusing at the wide angle end.

By making an arrangement such that a value does not fall below a lower limit value of conditional expression (20), the distortion is suppressed.

By making an arrangement such that an upper limit value of conditional expression (20) is not exceeded, sufficient angle of view is secured.

Moreover, in the zoom lens according to the present embodiment, it is preferable that at the wide angle end, a light ray of a half angle of view 33° or more is capable of passing through the zoom lens, and the zoom lens satisfies the following conditional expression (21).

$$2.6 < f_t/f_w < 7.0 \qquad (21)$$

where, $f_t$ denotes a focal length of the overall zoom lens system at the time of infinite object point focusing at the telephoto end, and $f_w$ denotes a focal length of the overall zoom lens system at the time of infinite object point focusing at the wide angle end.

By securing the zooming ratio such that a value does not fall below a lower limit value of conditional expression (21), selection of an appropriate angle of view according to various photography scenes is made possible.

Making an arrangement such that an upper limit value of conditional expression (21) is not exceeded contributes to both of shortening the overall length of the zoom lens and securing the optical performance.

Moreover, in the zoom lens according to the present invention, it is preferable that the second lens unit includes a single lens having a positive refractive power which is disposed nearest to the object side in the second lens unit, and a cemented lens of a negative lens and a positive lens in order from the object side, and the aperture stop is positioned between the single lens and the cemented lens in the second lens unit.

Accordingly, with a small number of lenses, the refractive power of the second lens unit is secured and a favorable function of correcting aberration is secured. Moreover, it is possible to dispose the aperture stop near a center of the second lens unit, which contributes to securing symmetry of the zoom lens with respect to the aperture stop, and contributes further to small-sizing and securing the optical performance.

Moreover, an image pickup apparatus according to the present embodiment includes one of the abovementioned zoom lenses, and an image pickup element which has an image pickup surface, and which converts an image formed on the image pickup surface by the zoom lens, to an electric signal.

In a case in which, the zoom lens has a focusing function, the abovementioned arrangements will be let to be arrangements in a state of being focused at an infinite object point.

It is preferable that the zoom lens satisfies a plurality of abovementioned arrangements simultaneously interactively. An arrangement may be made such that, the zoom lens satisfies some of the arrangements simultaneously. For instance, an arrangement may be made such that one of the abovementioned zoom lenses is used in one of the aforementioned zoom lenses or the image pickup apparatus. Moreover, even by making an arrangement such that the zoom lens satisfies each conditional expression separately, the respective effect is achieved, and therefore it is preferable to make such arrangement. For each conditional expression, by changing the upper limit value or the lower limit value as given below, an effect of such conditional expression is all the more assured, and therefore it is preferable.

For conditional expression (1), it is more preferable to let the lower limit value to be 0.85, and 0.91 is even more preferable.

Moreover, for conditional expression (1), it is more preferable to let the upper limit value to be 1.1, and 1.0 is even more preferable.

For conditional expression (2), it is more preferable to let the lower limit value to be −17.0%, and −15.0% is even more preferable.

Moreover, for conditional expression (2), it is more preferable to let the upper limit value to be −8.0%, and −10.0% is even more preferable.

For conditional expression (3), it is more preferable to let the lower limit value to be 0.40, and 0.45 is even more preferable.

Moreover, for conditional expression (3), it is more preferable to let the upper limit value to be 0.95, and 0.85 is even more preferable.

For conditional expression (4), it is more preferable to let the lower limit value to be 1.8 or 2.0, and 2.5 is even more preferable.

Moreover, for conditional expression (4), it is more preferable to let the upper limit value to be 3.5, and 3.2 is even more preferable.

For conditional expression (5), it is more preferable to let the lower limit value to be 0.8, and 0.85 is even more preferable.

Moreover, for conditional expression (5), it is more preferable to let the upper limit value to be 1.4, and 1.2 is even more preferable.

For conditional expression (6), it is more preferable to let the lower limit value to be 1.2, and 1.4 is even more preferable.

Moreover, for conditional expression (6), it is more preferable to let the upper limit value to be 2.2, and 1.9 is even more preferable.

For conditional expression (7), it is more preferable to let the lower limit value to be 1.7, and 1.9 is even more preferable.

Moreover, for conditional expression (7), it is more preferable to let the upper limit value to be 3.3, and 2.8 is even more preferable.

For conditional expression (8), it is more preferable to let the lower limit value to be −1.3, and −1.2 is even more preferable.

Moreover, for conditional expression (8), it is more preferable to let the upper limit value to be 0 or −0.1, and −0.5 is even more preferable.

For conditional expression (9), it is more preferable to let the lower limit value to be 0.7.

Moreover, for conditional expression (9), it is more preferable to let the upper limit value to be 1.0, and 0.9 is even more preferable.

For conditional expression (10), it is more preferable to let the lower limit value to be 1.1, and 1.15 is even more preferable.

Moreover, for conditional expression (10), it is more preferable to let the upper limit value to be 1.8, and 1.7 is even more preferable.

For conditional expression (11), it is more preferable to let the lower limit value to be 1.5, and 1.6 is even more preferable.

Moreover, for conditional expression (11), it is more preferable to let the upper limit value to be 2.45 or 2.4, and 2.3 is even more preferable.

For conditional expression (12), it is more preferable to let the lower limit value to be 65, and 67 is even more preferable.

Moreover, for conditional expression (12), it is more preferable to let the upper limit value to be 85, and 82 is even more preferable.

For conditional expression (13), it is more preferable to let the lower limit value to be −0.5, and −0.1 is even more preferable.

Moreover, for conditional expression (13), it is more preferable to let the upper limit value to be 1.3, and 1.2 is even more preferable.

For conditional expression (14), it is more preferable to let the lower limit value to be 0.9, and 1.2 is even more preferable.

Moreover, for conditional expression (14), it is more preferable to let the upper limit value to be 1.6, and 1.4 is even more preferable.

For conditional expression (15), it is more preferable to let the lower limit value to be 0.6, and 0.7 is even more preferable.

Moreover, for conditional expression (15), it is more preferable to let the upper limit value to be 1.1, and 1.05 is even more preferable.

For conditional expression (16), it is more preferable to let the lower limit value to be 0.5, and 0.55 is even more preferable.

Moreover, for conditional expression (16), it is more preferable to let the upper limit value to be 0.73.

For conditional expression (17), it is more preferable to let the lower limit value to be 3.5, and 4.1 is even more preferable.

Moreover, for conditional expression (17), it is more preferable to let the upper limit value to be 9.7, and 8 is even more preferable.

For conditional expression (18), it is more preferable to let the lower limit value to be 0.9.

Moreover, for conditional expression (18), it is more preferable to let the upper limit value to be 1.6 or 1.5, and 1.45 is even more preferable.

For conditional expression (19), it is more preferable to let the lower limit value to be 0.4, and 0.43 is even more preferable.

Moreover, for conditional expression (19), it is more preferable to let the upper limit value to be 0.58, and 0.57 is even more preferable.

For conditional expression (20), it is more preferable to let the lower limit value to be 0.735.

Moreover, for conditional expression (20), it is more preferable to let the upper limit value to be 0.75.

For conditional expression (21), it is more preferable to let the lower limit value to be 2.7, and 2.8 is even more preferable.

Moreover, for conditional expression (21), it is more preferable to let the upper limit value to be 5.0, and 4.0 is even more preferable.

Figure 15:
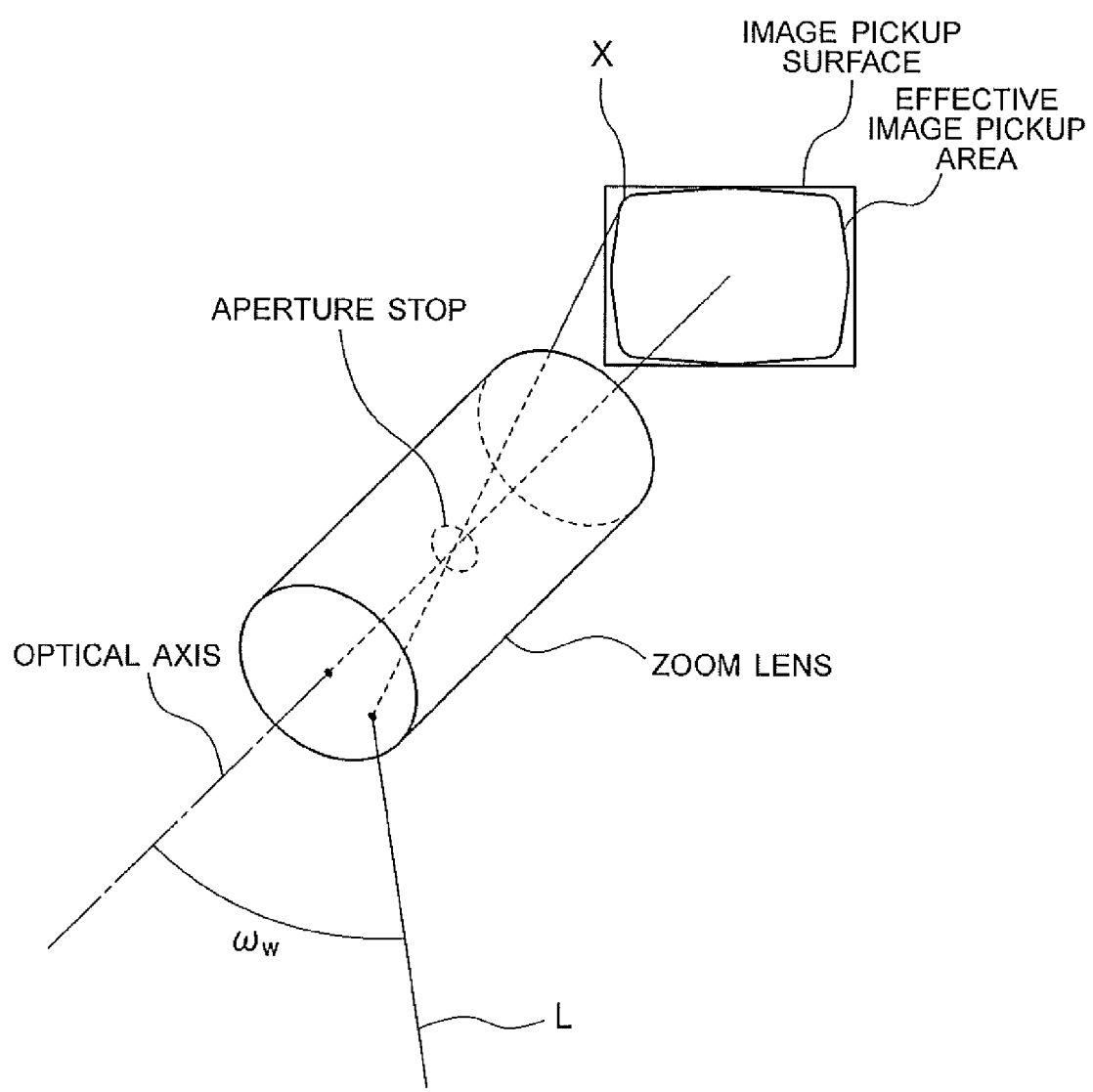
FIG. 15 is a diagram for explaining $\omega_W$.

$\omega_W$ (half angle of view at the time of focusing at an infinite object point at the wide angle end) will be explained below by using FIG. 15. In FIG. 15, as to how the zoom lens, the aperture stop, and the image pickup surface are disposed on the optical axis is shown. A light ray incident on the zoom lens, upon passing through the aperture stop, is emerged from the zoom lens and reaches the image pickup surface.

In FIG. 15, a light ray L indicated by a solid line, shows a light ray that reaches a point X on an effective image pickup area, out of the light rays that pass through a center of the aperture stop. Here, the effective image pickup area being an area, in which an object image is formed, the point X is at the maximum image-height position. In such manner, the light ray L is a light ray that passes through the center of the aperture stop, and is incident at the maximum image-height position of the effective image pickup area. Moreover, $\omega_W$ is a half angle of view of the light ray L with respect to the optical axis, at the wide angle end.

Examples of the zoom lens used in the image pickup apparatus according to the present invention will be described below in detail by referring to the accompanying diagrams. However, the present invention is not restricted to the examples described below.

Examples from an example 1 to an example 7 of the zoom lens will be described below. Lens cross-sectional views of the examples from the example 1 to the example 7 are shown in FIG. 1A, FIG. 1B, and FIG. 1C to FIG. 7A, FIG. 7B, and FIG. 7C. FIG. 1A, FIG. 2A, FIG. 3A, FIG. 4A, FIG. 5A, FIG. 6A, and FIG. 7A are cross-sectional views at a wide angle end, FIG. 1B, FIG. 2B, FIG. 3B, FIG. 4B, FIG. 5B, FIG. 6B, and FIG. 7B are cross-sectional views in an intermediate focal length state, and FIG. 1C, FIG. 2C, FIG. 3C, FIG. 4C, FIG. 5C, FIG. 6C, and FIG. 7C are cross-sectional views at a telephoto end. Each of FIG. 1A, FIG. 1B, and FIG. 1C to FIG. 7A, FIG. 7B, and FIG. 7C is a lens cross-sectional view when focused at an infinite object point.

Moreover, a first lens unit is denoted by G1, a second lens unit is denoted by G2, a third lens unit is denoted by G3, a fourth lens unit is denoted by G4, an aperture stop is denoted by S, a flare aperture is denoted by SF, and an image plane (image pickup surface) is denoted by I. Although it is not shown in the diagram, a flat and parallel plate which forms a low-pass filter and a cover glass of an electronic image pickup element may be disposed between the third lens unit G3 and the image plane I. A wavelength region restricting coating which restricts infrared light may be applied to a surface of the flat and parallel plate. Moreover, a multilayer film for restricting wavelength region may be applied to a surface of the cover glass. The cover glass C may be imparted an effect of a low-pass filter.

In the zoom lenses of the example from the example 1 to the example 7, an image height is same at the wide angle end, in the intermediate focal length state, and at the telephoto end. However, the image height at the wide angle end may be let to be small. This is because, letting the image at the wide angle end to be barrel-shaped, it is possible to correct distortion by converting the barrel-shaped image to a rectangular image electrically. Details of correcting the distortion electrically are omitted.

Figure 1B:
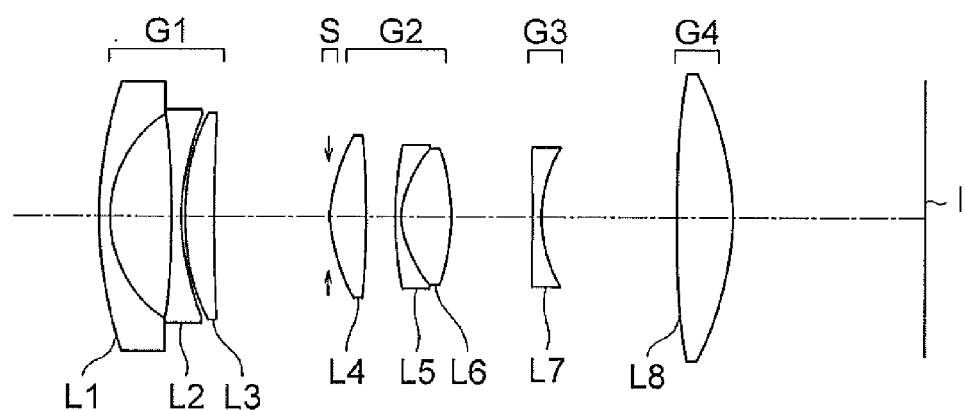
Figure 1C:
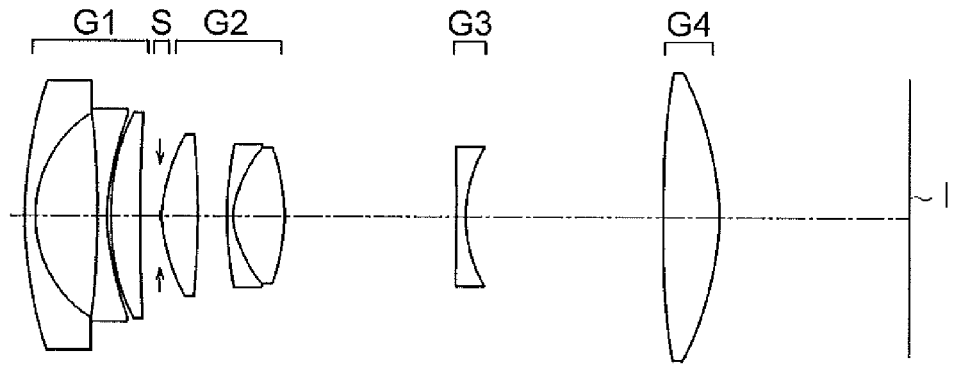

The zoom lens according to the example 1, as shown in FIG. 1A, FIG. 1B, and FIG. 1C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7. A cyclo-olefin polymer (specific gravity: 1.01 g/cm$^3$) is used for the biconcave negative lens L7.

The fourth lens unit G4 includes a biconvex positive lens L8.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). An aperture stop (stop) S moves toward the object side together with the second lens unit G2.

At the time of focusing, the third lens unit G3 moves along an optical axis.

An aspheric surface is provided to a total of eleven surfaces namely, both surfaces of the biconcave negative lens L2, both surfaces of the positive meniscus lens 13, both surfaces of the biconvex positive lens L4, an image-side surface of the biconvex positive lens L6, both surfaces of the biconcave negative lens L7, and both surfaces of the biconvex positive lens L8.

Figure 2A:
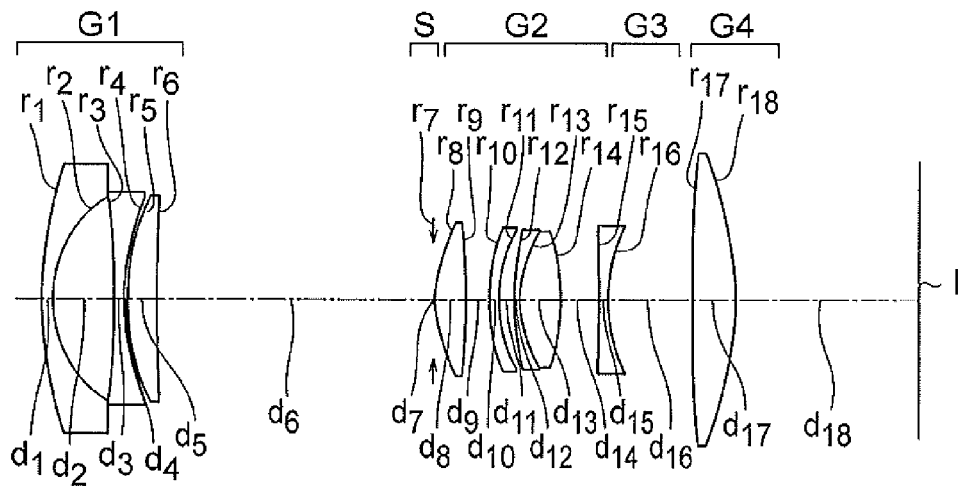
FIG. 2A, FIG. 2B, and FIG. 2C are lens cross-sectional views at the time of infinite object point focusing of a zoom lens according to an example 2 of the present invention, where.
Figure 2B:
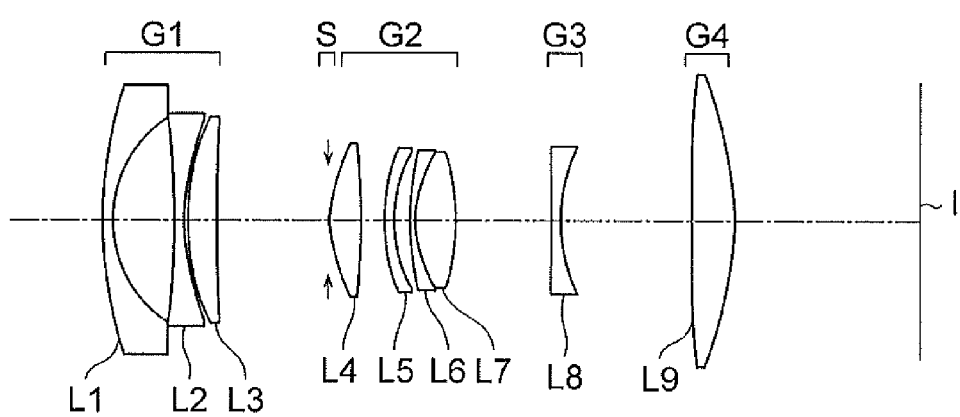
Figure 2C:
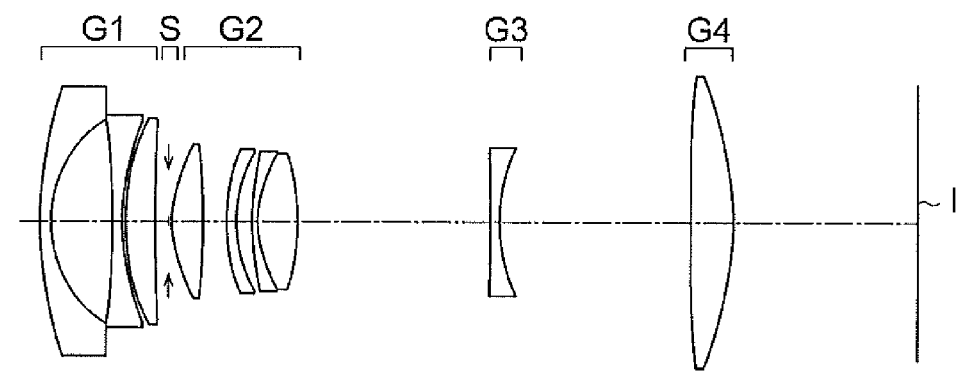

The zoom lens according to the example 2, as shown in FIG. 2A, FIG. 2B, and FIG. 2C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7. A cyclo-olefin polymer (specific gravity: 1.01 g/cm$^3$) is used for the biconcave negative lens L7.

The fourth lens unit G4 includes a positive meniscus lens L8 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). An aperture stop S moves toward the object side together with the second lens unit G2.

At the time of focusing, the third lens unit G3 moves along an optical axis.

An aspheric surface is provided to a total of nine surfaces namely, both surfaces of the biconcave negative lens L2, both surfaces of the positive meniscus lens L3, both surfaces of the biconvex positive lens L4, an image-side surface of the biconcave negative lens L7, and both surfaces of the biconvex positive lens L8.

Figure 3A:
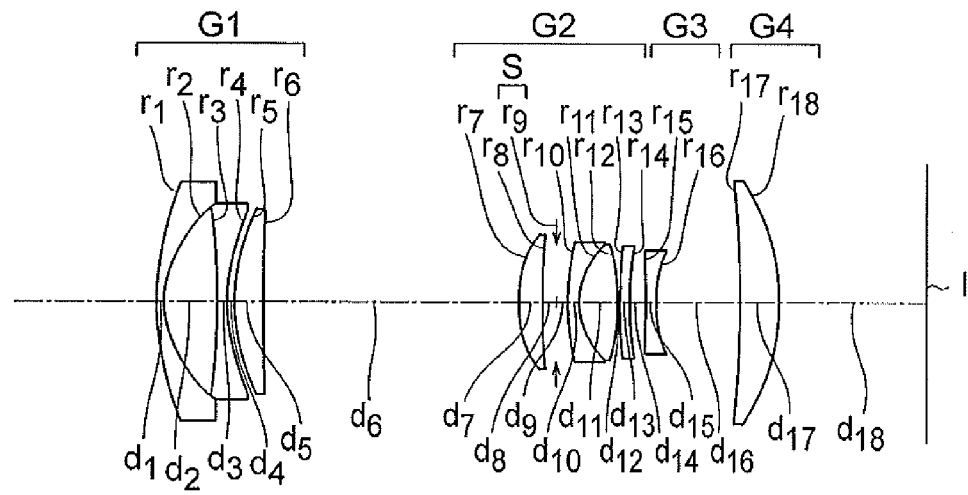
FIG. 3A, FIG. 3B, and FIG. 3C are lens cross-sectional views at the time of infinite object point focusing of a zoom lens according to an example 3 of the present invention, where.
Figure 3B:
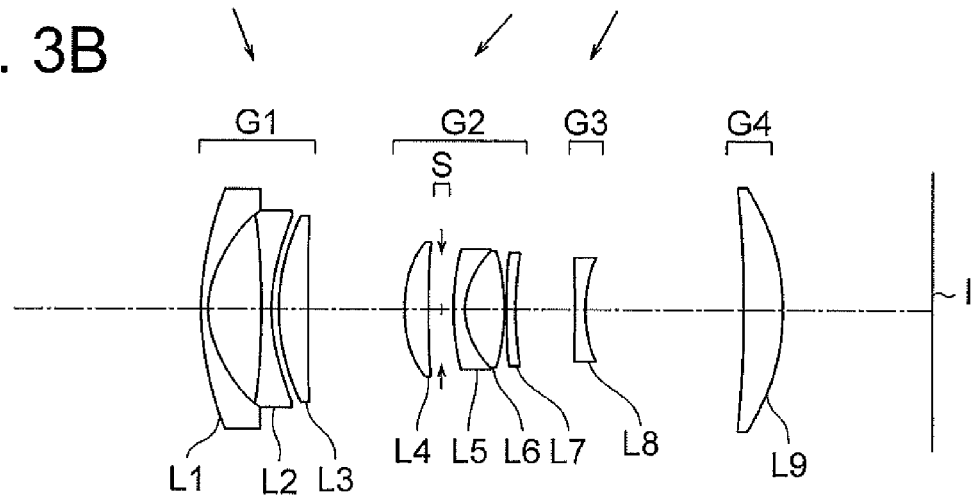
Figure 3C:
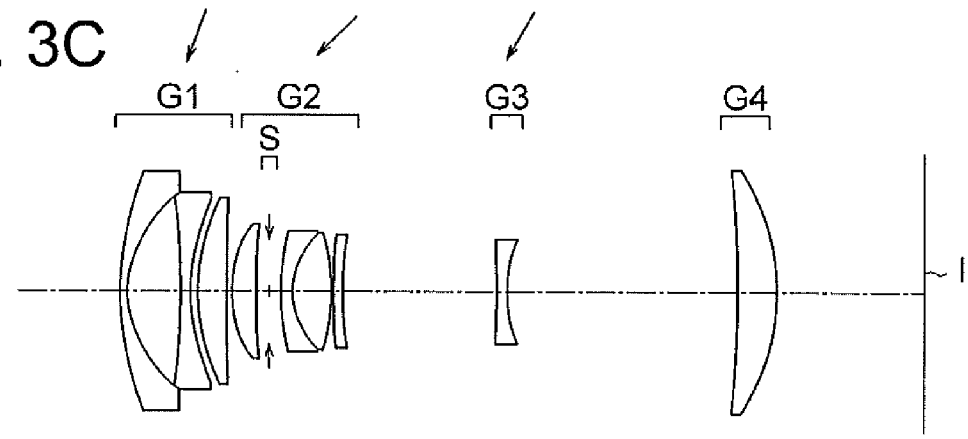

The zoom lens according to the example 3, as shown in FIG. 3A, FIG. 3B, and FIG. 3C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a negative meniscus lens L2 having a concave surface directed toward the object side, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a biconvex positive lens L6, and a negative meniscus lens L7 having a convex surface directed toward the object side. Here, the negative meniscus lens L5 and the biconvex positive lens L6 are cemented.

An aperture stop S is disposed in the second lens unit.

The third lens unit G3 includes a biconcave negative lens L8. M-PCD 4 (specific gravity: 3.57 g/cm$^3$) is used for the biconcave negative lens L8.

The fourth lens unit G4 includes a positive meniscus lens L9 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of eight surfaces namely, both surfaces of the negative meniscus lens L2, both surfaces of the positive meniscus lens L4, both surface of the biconcave negative lens L8, and both surfaces of the positive meniscus lens L9.

Figure 4A:
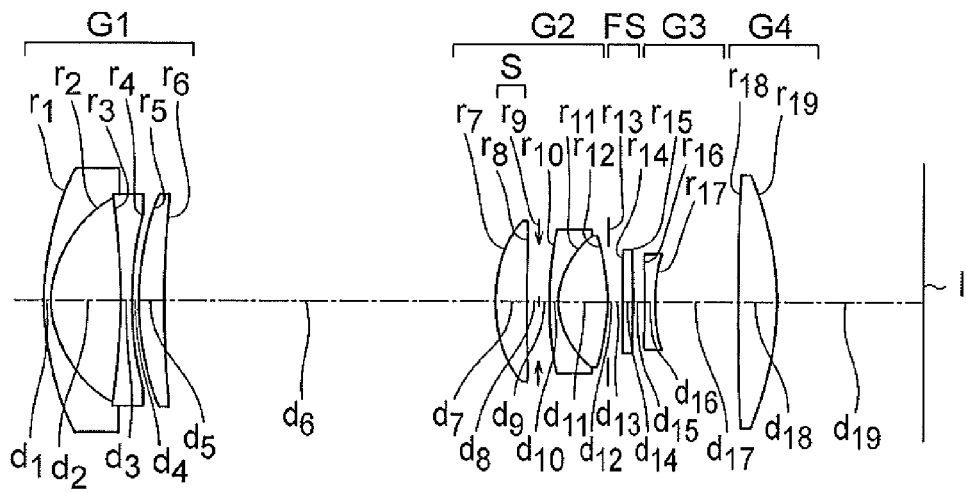
FIG. 4A, FIG. 4B, and FIG. 4C are lens cross-sectional views at the time of infinite object point focusing of a zoom lens according to an example 4 of the present invention, where.
Figure 4B:
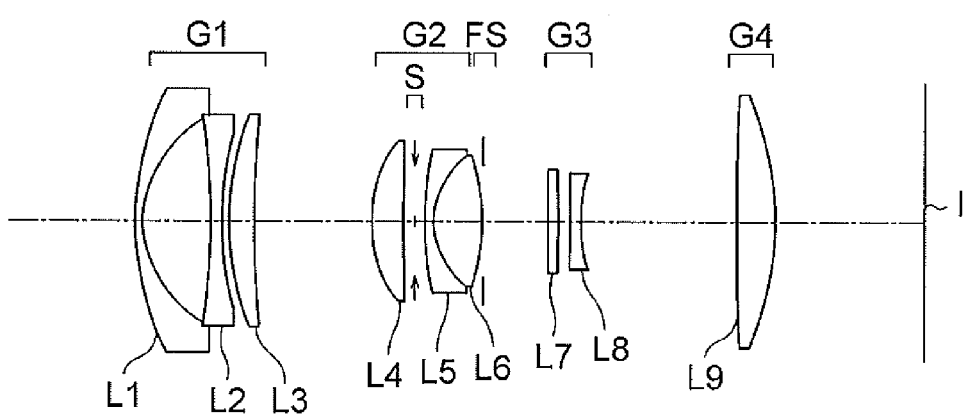
Figure 4C:
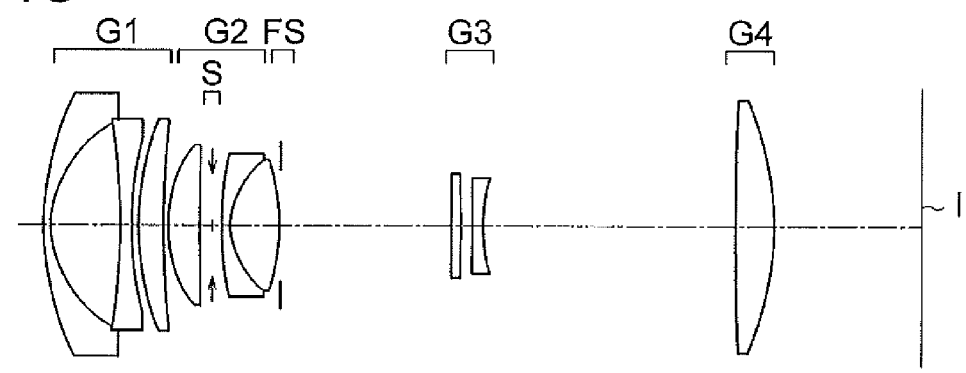

The zoom lens according to the example 4, as shown in FIG. 4A, FIG. 4B, and FIG. 4C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a negative meniscus lens L2 having a concave surface directed toward the object side, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

An aperture stop S is disposed in the second lens unit G2.

A flare aperture SF is disposed between the second lens unit G2 and the third lens unit G3.

The third lens unit G3 includes a biconvex positive lens L7 and a biconcave negative lens L8. S-TIM 3 and M-TAC 80 (specific gravity: 2.6 g/cm$^3$ and 4.28 g/cm$^3$ respectively) are used for the biconvex positive lens L7 and the biconcave negative lens L8.

The fourth lens unit G4 includes a positive meniscus lens L9 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of nine surfaces namely, both surfaces of the negative meniscus lens L2, both surfaces of the biconvex positive lens L4, an image-side surface of the biconvex positive lens L7, both surfaces of the biconcave negative lens L8, and both surfaces of the positive meniscus lens L9.

Figure 5A:
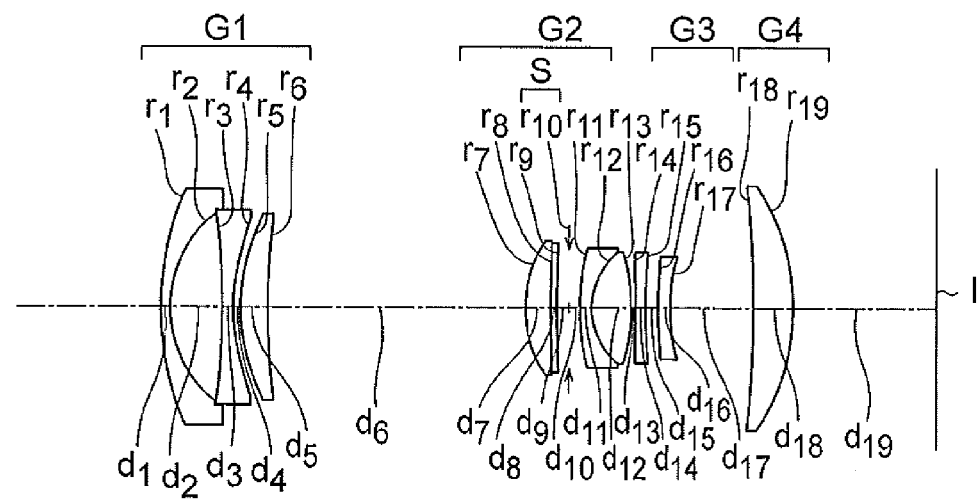
FIG. 5A, FIG. 5B, and FIG. 5C are lens cross-sectional views at the time of infinite object point focusing of a zoom lens according to an example 5 of the present invention, where.
Figure 5B:
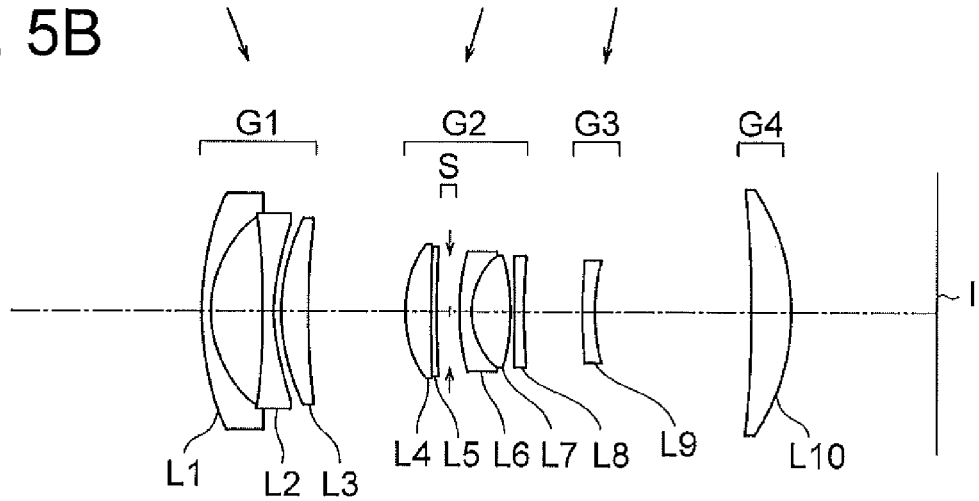
Figure 5C:
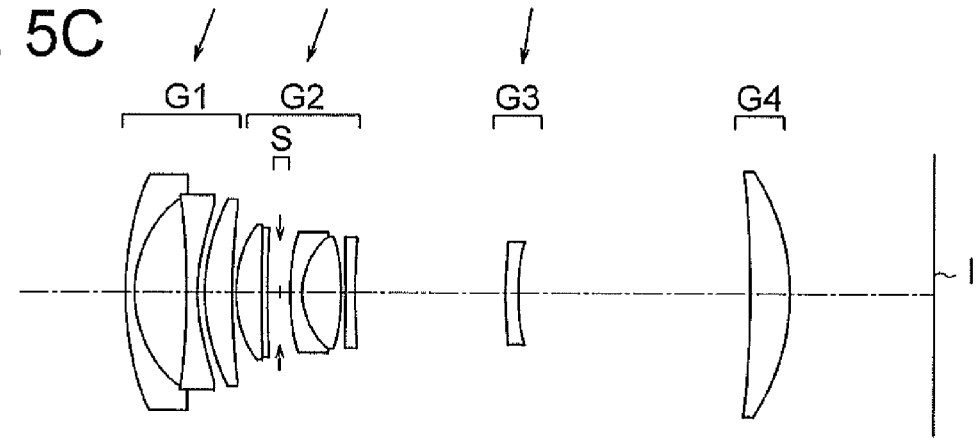

The zoom lens according to the example 5, as shown in FIG. 5A, FIG. 5B, and FIG. 5C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a negative meniscus lens L2 having a concave surface directed toward the object side, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, a negative meniscus lens L6 having a convex surface directed toward the object side, a biconvex positive lens L7, and a negative meniscus lens L8 having a convex surface directed toward the object side.

Here, the positive meniscus lens L4 and the negative meniscus lens L5 are cemented. Moreover, the negative meniscus lens L6 and the biconvex positive lens L7 are cemented.

An aperture stop S is disposed in the second lens unit G2.

The third lens unit G3 includes a negative meniscus lens L9 having a convex surface directed toward the object side. M-PCD 4 (specific gravity: 3.57 g/cm$^3$) is used for the biconvex positive lens L7 and the biconcave negative lens L8.

The fourth lens unit G4 includes a positive meniscus lens L10 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (stationary). The aperture stop S moves toward the object side together with the second lens unit G2.

At the time of focusing, the third lens unit G3 moves along an optical axis.

An aspheric surface is provided to a total of eight surfaces namely, both surfaces of the negative meniscus lens L2, both surfaces of the positive meniscus lens L3, both surfaces of the negative meniscus lens L9, and both surfaces of the positive meniscus lens L10.

Figure 6A:
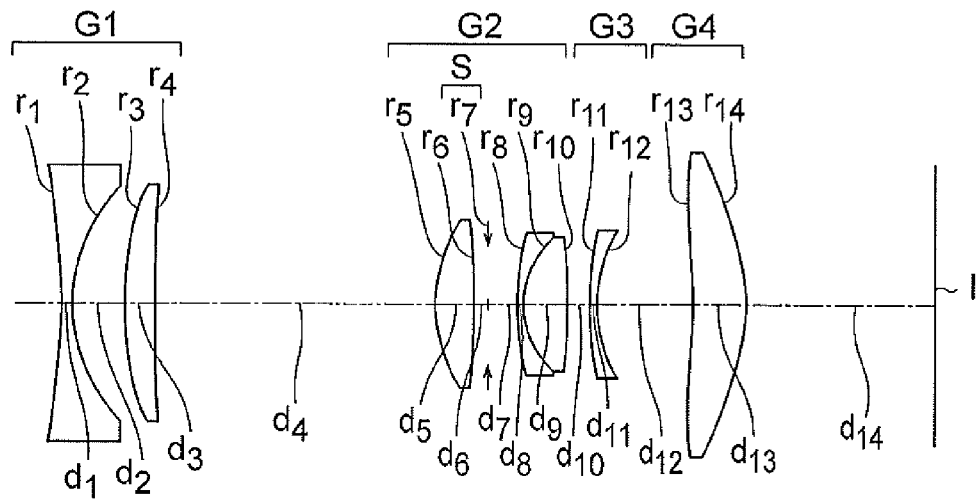
FIG. 6A, FIG. 6B, and FIG. 6C are lens cross-sectional views at the time of infinite object point focusing of a zoom lens according to an example 6 of the present invention, where.
Figure 6B:
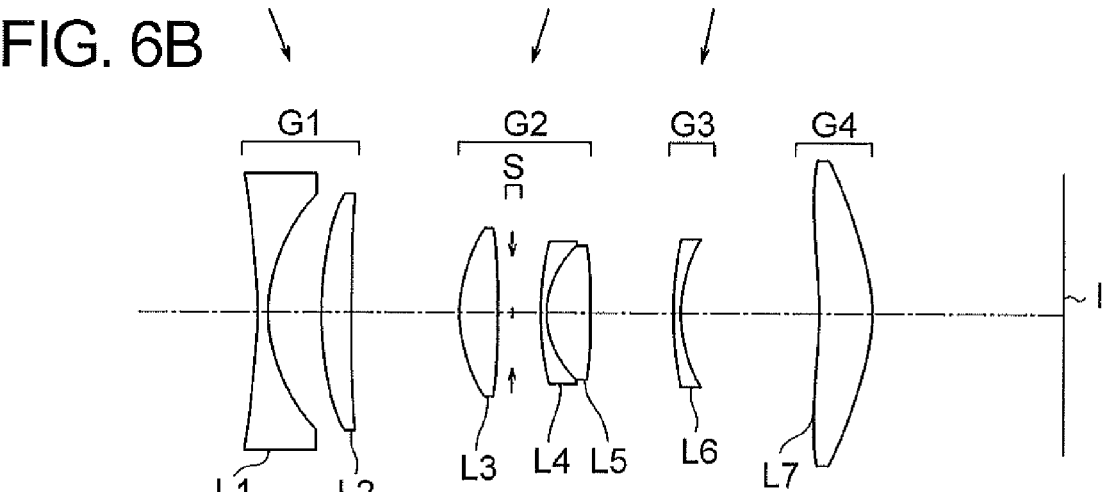
Figure 6C:
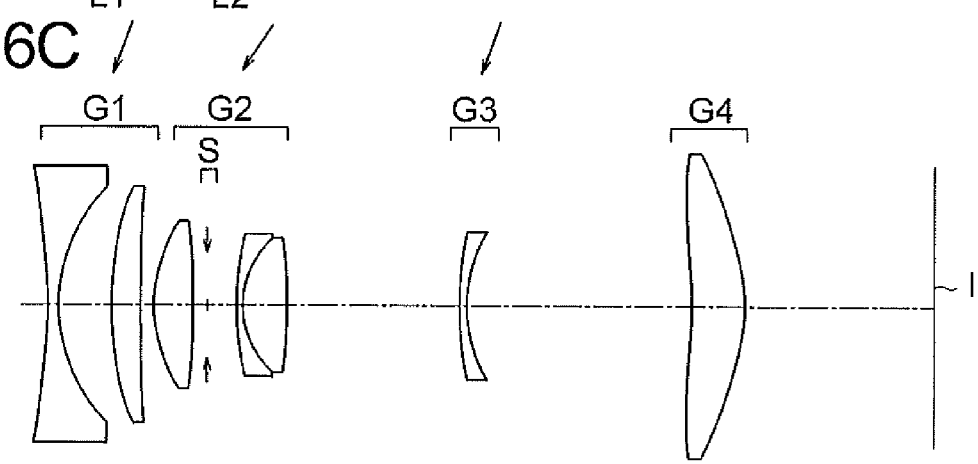

The zoom lens according to the example 6, as shown in FIG. 6A, FIG. 6B, and FIG. 6C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a biconcave negative lens L1 and a negative meniscus lens L2 having a concave surface directed toward the object side.

The second lens unit G2 includes a biconvex positive lens L3, a negative meniscus lens L4 having a convex surface directed toward the object side, and a biconvex positive lens L5.

Here, the negative meniscus lens L4 and the biconvex positive lens L5 are cemented.

An aperture stop S is disposed in the second lens unit G2.

The third lens unit G3 includes a negative meniscus lens L6 having a convex surface directed toward the object side. M-TAF 31 (specific gravity: 4.84 g/cm$^3$) is used for the negative meniscus lens L6.

The fourth lens unit G4 includes a positive meniscus lens L7 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of 11 surfaces namely, both surfaces of the biconcave negative lens L1, both surfaces of the negative meniscus lens L2, both surfaces of the biconvex positive lens L3, an image-side surface of the biconvex positive lens L5, both surfaces of the negative meniscus lens L6, and both surfaces of the positive meniscus lens L7.

Figure 7A:
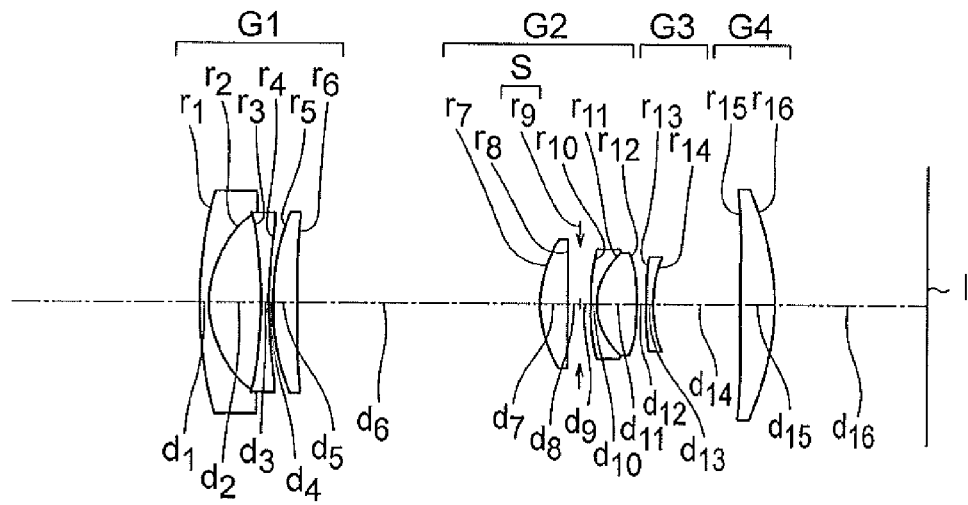
FIG. 7A, FIG. 7B, and FIG. 7C are lens cross-sectional views at the time of infinite object point focusing of a zoom lens according to an example 7 of the present invention, where.
Figure 7B:
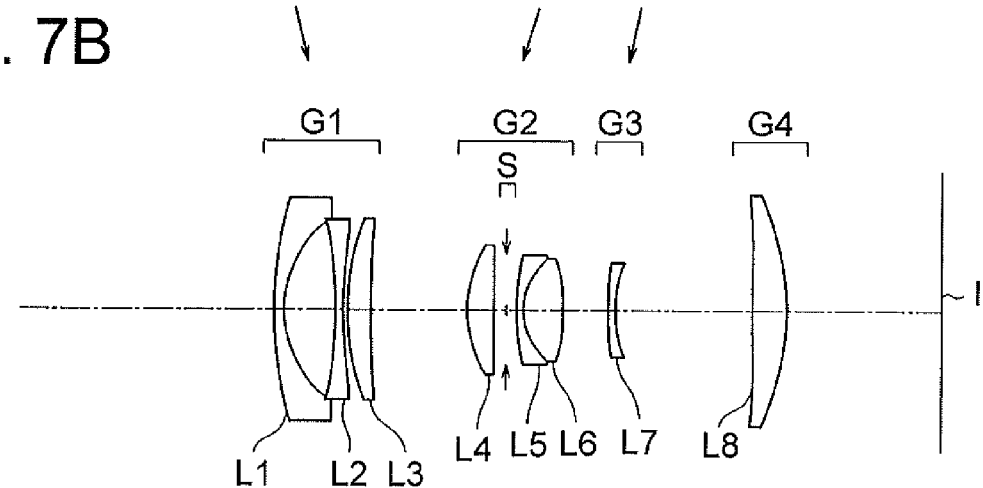
Figure 7C:
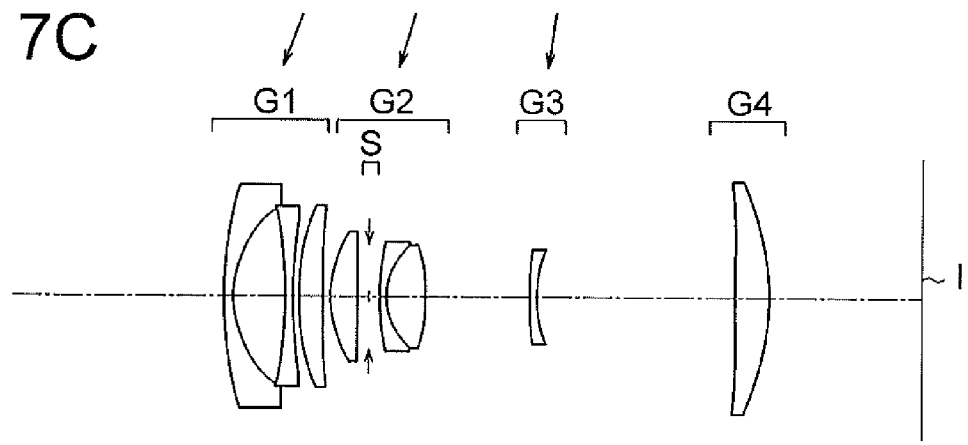
Figure 9A:
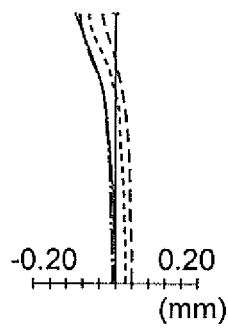
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the zoom lens according to the example 2.
Figure 9B:
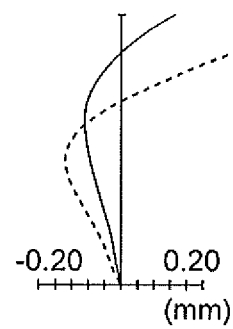
Figure 9C:
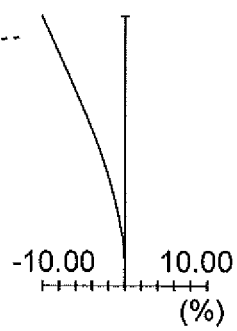
Figure 9D:
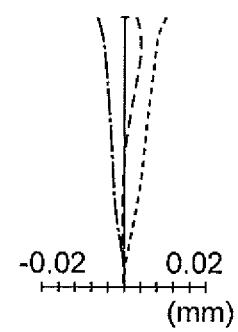
Figure 9E:
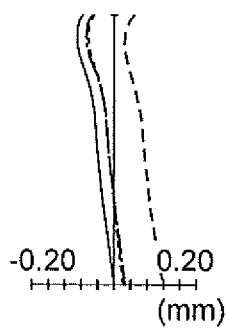
Figure 9F:
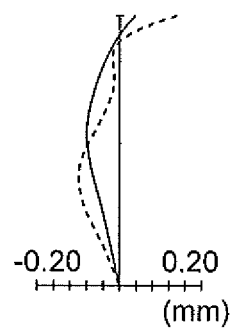
Figure 9G:
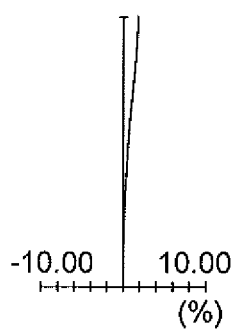
Figure 9H:
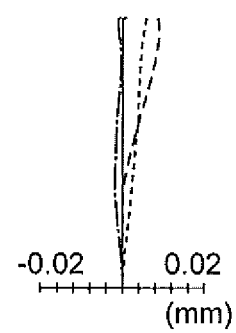
Figure 9I:
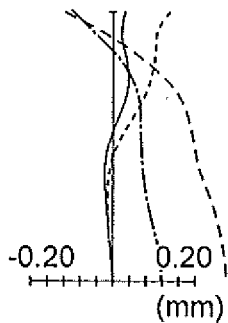
Figure 9J:
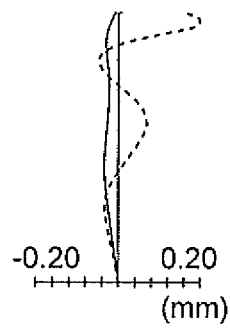
Figure 9K:
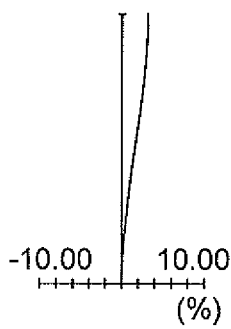
Figure 9L:
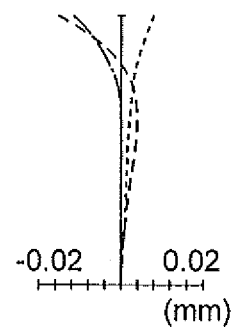

The zoom lens according to the example 7, as shown in FIG. 7A, FIG. 7B, and FIG. 7C, includes in order from an object side, a first lens unit G1 having a negative refractive power, a second lens unit G2 having a positive refractive power, a third lens unit G3 having a negative refractive power, and a fourth lens unit G4 having a positive refractive power.

The first lens unit G1 includes a negative meniscus lens L1 having a convex surface directed toward the object side, a biconcave negative lens L2, and a positive meniscus lens L3 having a concave surface directed toward the object side.

The second lens unit G2 includes a biconvex positive lens L4, a negative meniscus lens L5 having a convex surface directed toward the object side, and a biconvex positive lens L6.

Here, the negative meniscus lens L5 and the biconvex positive lens L6 are cemented.

An aperture stop S is disposed in the second lens unit G2.

The third lens unit G3 includes a negative meniscus lens L7 having a convex surface directed toward the object side. A cyclo-olefin polymer (specific gravity: 1.01 g/cm$^3$) is used for the negative meniscus lens L7.

The fourth lens unit G4 includes a positive meniscus lens L8 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of seven surfaces namely, both surfaces of the biconcave negative lens L2, both surfaces of the biconvex positive lens L4, an image-side surface of the biconvex positive lens L6, and both surfaces of the negative meniscus lens L7.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus, Lens total length is a distance from a lens forefront surface up to a lens backmost surface (without air conversion) and each of f1, f2 ... is a focal length of each lens unit. Further, FB (back focus) is a unit which is expressed upon air conversion of a distance from the lens backmost surface to a paraxial image surface. Further, WE denotes a wide angle end, ST denotes a intermediate focal length state, TE denotes a telephoto end.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}+A12y^{12}$$

Further, in the aspherical surface coefficients, 'e-n' (where, n is an integral number) indicates '10$^{-n}$'. Moreover, these symbols are commonly used in the following numerical data for each example.

In the above expression which defines the shape of an aspheric surface, aspheric surface coefficients are described up until 12th order. However, terms after 14th order are defined in the similar way.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 32.952 | 0.800 | 1.83481 | 42.71 |
| 2 | 10.155 | 4.717 | | |
| 3* | −70.369 | 0.700 | 1.53071 | 55.69 |
| 4* | 17.346 | 0.200 | | |
| 5* | 16.108 | 2.280 | 1.63493 | 23.90 |
| 6* | 94.815 | Variable | | |
| 7(Stop) | ∞ | 0.000 | | |
| 8* | 11.597 | 2.704 | 1.72903 | 54.04 |
| 9* | −48.854 | 2.371 | | |
| 10 | 37.526 | 0.400 | 1.91082 | 35.25 |
| 11 | 7.500 | 3.800 | 1.49700 | 81.54 |
| 12* | −17.919 | Variable | | |
| 13* | −28.586 | 0.655 | 1.53071 | 55.69 |
| 14* | 15.539 | Variable | | |
| 15* | 482.827 | 4.441 | 1.53071 | 55.69 |
| 16* | −19.757 | 14.397 | | |
| Image plane (Image pickup surface) | ∞ | | | |
| Stop surface | 7 | | | |

| Aspherical surface data |
|---|

3rd surface k = 0.0000
A4 = 6.3095e−005, A6 = −5.1630e−006, A8 = 8.5489e−008,
A10 = −5.2838e−010, A12 = 8.2000e−013, A14 = 0.0000e+000,
A16 = 0.0000e+000, A18 = 0.0000e+000, A20 = 0.0000e+000
4th surface k = 0.0000
A4 = −8.5006e−005, A6 = 2.3032e−006, A8 = −8.0995e−008,
A10 = 5.8944e−010, A12 = 9.6444e−013, A14 = 0.0000e+000,
A16 = 0.0000e+000, A18 = 0.0000e+000, A20 = 0.0000e+000
5th surface k = 0.0000
A4 = −1.6550e−004, A6 = 5.3129e−006, A8 = −6.3757e−008,
A10 = 5.8933e−011, A12 = 1.7278e−013, A14 = 0.0000e+000,
A16 = 0.0000e+000, A18 = 0.0000e+000, A20 = 0.0000e+000
6th surface k = 0.0000
A4 = −8.5352e−005, A6 = −1.2738e−006, A8 = 1.0586e−007,
A10 = −1.6152e−009, A12 = 5.4327e−012, A14 = 0.0000e+000,
A16 = 0.0000e+000, A18 = 0.0000e+000, A20 = 0.0000e+000
8th surface k = 0.0000
A4 = −5.4003e−005, A6 = −1.1160e−006, A8 = 4.8916e−008,
A10 = −1.2686e−009, A12 = 0.0000e+000, A14 = 0.0000e+000,
A16 = 0.0000e+000, A18 = 0.0000e+000, A20 = 0.0000e+000
9th surface k = 0.0000
A4 = 8.5204e−005, A6 = −7.2046e−007, A8 = 2.3364e−008,
A10 = −9.2428e−010, A12 = 0.0000e+000, A14 = 0.0000e+000,
A16 = 0.0000e+000, A18 = 0.0000e+000, A20 = 0.0000e+000
12th surface k = 0.0000
A4 = −3.9591e−005, A6 = 3.1189e−007, A8 = −8.0865e−009,
A10 = −2.2218e−010, A12 = 0.0000e+000, A14 = 0.0000e+000,
A16 = 0.0000e+000, A18 = 0.0000e+000, A20 = 0.0000e+000

-continued

Unit mm

13th surface k = 0.0000
A4 = 1.4055e−003, A6 = −6.9765e−005, A8 = 2.0005e−006,
A10 = −2.4498e−008, A12 = 0.0000e+000, A14 = 0.0000e+000,
A16 = 0.0000e+000, A18 = 0.0000e+000, A20 = 0.0000e+000
14th surface k = 0.0000
A4 = 1.5120e−003, A6 = −6.6186e−005, A8 = 1.7698e−006,
A10 = −2.0638e−008, A12 = 0.0000e+000, A14 = 0.0000e+000,
A16 = 0.0000e+000, A18 = 0.0000e+000, A20 = 0.0000e+000
15th surface k = 0.0000
A4 = −1.0033e−005, A6 = 1.0004e−006, A8 = −3.4917e−009,
A10 = −3.8383e−011, A12 = 2.4084e−013, A14 = 0.0000e+000,
A16 = 0.0000e+000, A18 = 0.0000e+000, A20 = 0.0000e+000
16th surface k = 0.0000
A4 = 9.4025e−006, A6 = −1.9232e−007, A8 = 1.6315e−008,
A10 = −1.7709e−010, A12 = 6.0101e−013, A14 = 0.0000e+000,
A16 = 0.0000e+000, A18 = 0.0000e+000, A20 = 0.0000e+000

Zoom data

|  | WE | ST | TE |
|---|---|---|---|
| f (mm) | 12.240 | 22.450 | 41.180 |
| FNO. | 3.631 | 4.559 | 5.743 |
| 2ω(Angle of field) | 91.2 | 52.1 | 29.7 |
| FB (mm) | 14.397 | 14.397 | 14.396 |
| IH | 11.15 | 11.15 | 11.15 |
| Lens total length | 53.186 | 48.509 | 53.186 |
| d6 | 21.610 | 8.889 | 1.550 |
| d12 | 2.077 | 6.221 | 13.400 |
| d14 | 6.431 | 10.331 | 15.168 |

Unit focal length f1 = −16 f2 = 14.1454 f3 = −18.8711 f4 = 35.8735

EXAMPLE 2

Unit mm

Surface data

| Surface no. | r | d | nd | νd |
|---|---|---|---|---|
| Object plane | ∞ | ∞ | | |
| 1 | 38.137 | 0.800 | 1.88300 | 40.76 |
| 2 | 10.297 | 4.648 | | |
| 3* | −598.623 | 0.700 | 1.49700 | 81.54 |
| 4* | 18.149 | 0.200 | | |
| 5 | 20.632 | 2.125 | 1.84666 | 23.78 |
| 6 | 77.931 | Variable | | |
| 7(Stop) | ∞ | 0.000 | | |
| 8* | 12.153 | 2.368 | 1.69350 | 53.18 |
| 9* | −53.853 | 1.749 | | |
| 10 | 16.081 | 0.700 | 2.00100 | 29.13 |
| 11 | 11.478 | 1.177 | | |
| 12 | 23.763 | 0.400 | 1.90366 | 31.32 |
| 13 | 9.500 | 3.221 | 1.49700 | 81.54 |
| 14* | −17.393 | Variable | | |
| 15* | −24.713 | 0.600 | 1.53071 | 55.69 |
| 16* | 21.274 | Variable | | |
| 17* | −251.001 | 3.300 | 1.76802 | 49.24 |
| 18* | −24.035 | 13.974 | | |
| Image plane (Image pickup surface) | ∞ | | | |
| Stop surface | 7 | | | |

Aspherical surface data

3rd surface k = 0.0000
A4 = −4.8576e−004, A6 = 1.7552e−005, A8 = −3.6978e−007,
A10 = 4.0188e−009, A12 = −1.7910e−011, A14 = 0.0000e+000,
A16 = 0.0000e+000, A18 = 0.0000e+000, A20 = 0.0000e+000
4th surface k = 0.0000,
A4 = −5.5517e−004, A6 = 1.8119e−005, A8 = −3.9773e−007,
A10 = 4.4257e−009, A12 = −2.0135e−011, A14 = 0.0000e+000,
A16 = 0.0000e+000, A18 = 0.0000e+000, A20 = 0.0000e+000
8th surface k = 0.0000,
A4 = −5.5324e−005, A6 = −1.0806e−006, A8 = 6.2866e−008,
A10 = −1.3181e−009, A12 = 0.0000e+000, A14 = 0.0000e+000,
A16 = 0.0000e+000, A18 = 0.0000e+000, A20 = 0.0000e+000
9th surface k = 0.0000
A4 = 8.0278e−005, A6 = −9.0607e−007, A8 = 5.3088e−008,
A10 = −1.2194e−009, A12 = 0.0000e+000, A14 = 0.0000e+000,
A16 = 0.0000e+000, A18 = 0.0000e+000, A20 = 0.0000e+000,
14th surface k = 0.0000
A4 = −4.5593e−005, A6 = 7.2127e−007, A8 = −3.1059e−008,
A10 = 7.7622e−010, A12 = 0.0000e+000, A14 = 0.0000e+000,
A16 = 0.0000e+000, A18 = 0.0000e+000, A20 = 0.0000e+000
15th surface k = 0.0000
A4 = 1.3073e−003, A6 = −5.9677e−005, A8 = 1.7420e−006,
A10 = −2.2403e−008, A12 = 0.0000e+000, A14 = 0.0000e+000,
A16 = 0.0000e+000, A18 = 0.0000e+000, A20 = 0.0000e+000
16th surface k = 0.0000
A4 = 1.3701e−003, A6 = −5.5301e−005, A8 = 1.5193e−006,
A10 = −1.8679e−008, A12 = 0.0000e+000, A14 = 0.0000e+000,
A16 = 0.0000e+000, A18 = 0.0000e+000, A20 = 0.0000e+000
17th surface k = 0.0000
A4 = 2.3484e−005, A6 = −3.0325e−008, A8 = 4.1172e−009,
A10 = −3.9432e−011, A12 = 1.2720e−013, A14 = 0.0000e+000,
A16 = 0.0000e+000, A18 = 0.0000e+000, A20 = 0.0000e+000
18th surface k = 0.0000
A4 = 2.7567e−005, A6 = −9.5799e−008, A8 = 3.1630e−009,
A10 = −2.4649e−011, A12 = 7.7900e−014, A14 = 0.0000e+000,
A16 = 0.0000e+000, A18 = 0.0000e+000, A20 = 0.0000e+000

Zoom data

|  | WE | ST | TE |
|---|---|---|---|
| f (mm) | 12.238 | 21.897 | 39.198 |
| FNO. | 3.623 | 4.468 | 5.736 |
| 2ω(Angle of field) | 91.4 | 53.2 | 30.8 |
| FB (mm) | 13.974 | 13.974 | 13.974 |
| IH | 11.15 | 11.15 | 11.15 |
| Lens total length | 52.845 | 48.378 | 53.095 |
| d6 | 21.371 | 8.880 | 1.550 |

-continued

Unit mm

| | | | |
|---|---|---|---|
| d14 | 2.963 | 7.372 | 14.846 |
| d16 | 6.523 | 10.138 | 14.711 |

Unit focal length f1 = −16.9116 f2 = 15.0814 f3 = −21.4447 f4 = 34.3913

EXAMPLE 3

Unit mm

Surface data

| Surface no. | r | d | nd | vd |
|---|---|---|---|---|
| Object plane | ∞ | ∞ | | |
| 1 | 29.848 | 0.800 | 1.88300 | 40.80 |
| 2 | 11.140 | 5.015 | | |
| 3* | 1984.401 | 1.000 | 1.62263 | 58.16 |
| 4* | 16.340 | 0.700 | | |
| 5 | 21.277 | 2.585 | 1.84666 | 23.78 |
| 6 | 97.119 | Variable | | |
| 7* | 13.066 | 2.415 | 1.82080 | 42.71 |
| 8* | 156.306 | 1.285 | | |
| 9 (Stop) | ∞ | 1.000 | | |
| 10 | 25.322 | 1.055 | 1.80000 | 29.84 |
| 11 | 7.246 | 3.754 | 1.49700 | 81.54 |
| 12 | −21.771 | 0.250 | | |
| 13 | 66.440 | 1.000 | 1.49700 | 81.54 |
| 14 | 48.900 | Variable | | |
| 15* | 505.239 | 1.000 | 1.61881 | 63.85 |
| 16* | 13.517 | Variable | | |
| 17* | −157.716 | 3.653 | 1.72903 | 54.04 |
| 18* | −23.343 | 14.203 | | |
| Image plane (Image pickup surface) | ∞ | | | |
| Stop surface | 9 | | | |

Aspherical surface data

3rd surface k = 0.0000
A4 = −3.9379e−004, A6 = 1.0647e−005, A8 = −1.6978e−007,
A10 = 1.4500e−009, A12 = −5.1500e−012, A14 = 0.0000e+000,
A16 = 0.0000e+000, A18 = 0.0000e+000, A20 = 0.0000e+000

4th surface k = 0.0000
A4 = −4.5183e−004, A6 = 1.1467e−005, A8 = −1.9507e−007,
A10 = 1.7598e−009, A12 = −6.6344e−012, A14 = 0.0000e+000,
A16 = 0.0000e+000, A18 = 0.0000e+000, A20 = 0.0000e+000

7th surface k = 0.0000
A4 = −4.2932e−006, A6 = 4.6954e−007, A8 = −3.4902e−009,
A10 = 3.0475e−011, A12 = 0.0000e+000, A14 = 0.0000e+000,
A16 = 0.0000e+000, A18 = 0.0000e+000, A20 = 0.0000e+000

8th surface k = 0.0000
A4 = 6.1702e−005, A6 = 6.0143e−007, A8 = −1.0191e−008,
A10 = 8.6614e−011, A12 = 0.0000e+000, A14 = 0.0000e+000,
A16 = 0.0000e+000, A18 = 0.0000e+000, A20 = 0.0000e+000

15th surface k = 0.0000
A4 = 1.4476e−004, A6 = −8.0102e−006, A8 = 3.2317e−007,
A10 = −4.3184e−009, A12 = 0.0000e+000, A14 = 0.0000e+000,
A16 = 0.0000e+000, A18 = 0.0000e+000, A20 = 0.0000e+000

16th surface k = 0.0000
A4 = 2.0586e−004, A6 = −7.8912e−006, A8 = 2.3579e−007,
A10 = −2.1593e−009, A12 = 0.0000e+000, A14 = 0.0000e+000,
A16 = 0.0000e+000, A18 = 0.0000e+000, A20 = 0.0000e+000

17th surface k = 0.0000
A4 = −6.2356e−005, A6 = 8.0243e−007, A8 = −2.9536e−009,
A10 = −2.1108e−012, A12 = 0.0000e+000, A14 = 0.0000e+000,
A16 = 0.0000e+000, A18 = 0.0000e+000, A20 = 0.0000e+000

18th surface k = 0.0000
A4 = −5.2173e−005, A6 = 5.3860e−007, A8 = −2.4108e−010,
A10 = −1.0254e−011, A12 = 0.0000e+000, A14 = 0.0000e+000,
A16 = 0.0000e+000, A18 = 0.0000e+000, A20 = 0.0000e+000

Zoom data

| | WE | ST | TE |
|---|---|---|---|
| f (mm) | 12.240 | 24.441 | 48.804 |
| FNO. | 3.570 | 4.670 | 6.411 |
| 2ω (Angle of field) | 91.4 | 48.4 | 25.0 |
| FB (mm) | 14.203 | 14.202 | 14.203 |
| IH | 11.15 | 11.15 | 11.15 |
| Lens total length | 58.907 | 55.151 | 62.208 |
| d6 | 24.200 | 9.114 | 0.400 |
| d14 | 1.346 | 5.556 | 14.391 |
| d16 | 7.849 | 14.969 | 21.905 |

Unit focal length f1 = −17.9851  f2 = 15.448  f3 = −22.4611  f4 = 37.156

EXAMPLE 4

Unit mm

Surface data

| Surface no. | r | d | nd | vd |
|---|---|---|---|---|
| Object plane | ∞ | ∞ | | |
| 1 | 28.574 | 0.800 | 1.88300 | 40.80 |
| 2 | 11.620 | 6.331 | | |
| 3* | 336.342 | 1.000 | 1.67790 | 54.89 |
| 4* | 20.395 | 0.700 | | |
| 5 | 29.660 | 2.425 | 1.92286 | 20.88 |
| 6 | 117.997 | Variable | | |
| 7* | 13.389 | 3.142 | 1.80139 | 45.45 |
| 8* | −150.876 | 1.100 | | |
| 9 (Stop) | ∞ | 1.000 | | |
| 10 | 41.539 | 0.800 | 1.85026 | 32.27 |
| 11 | 7.932 | 4.724 | 1.49700 | 81.54 |
| 12* | −21.295 | 0.000 | | |
| 13 | ∞ | Variable | | |
| 14 | 179.666 | 1.024 | 1.61293 | 37.00 |
| 15 | −111.032 | 0.929 | | |
| 16* | −42.967 | 1.000 | 1.72903 | 54.04 |
| 17* | 16.268 | Variable | | |

-continued

| Unit mm | | | | |
|---|---|---|---|---|
| 18* | −647.715 | 3.744 | 1.72903 | 54.04 |
| 19* | −27.101 | 14.201 | | |
| Image plane (Image pickup surface) | ∞ | | | |
| Stop surface | 9 | | | |

Aspherical surface data

3rd surface k = 0.0000
A4 = −3.6269e−004, A6 = 6.5776e−006, A8 = −7.4120e−008,
A10 = 4.5851e−010, A12 = −1.2126e−012, A14 = 0.0000e+000,
A16 = 0.0000e+000, A18 = 0.0000e+000, A20 = 0.0000e+000

4th surface k = 0.0000
A4 = −4.1038e−004, A6 = 7.1160e−006, A8 = −8.4794e−008,
A10 = 5.4616e−010, A12 = −1.5066e−012, A14 = 0.0000e+000,
A16 = 0.0000e+000, A18 = 0.0000e+000, A20 = 0.0000e+000

7th surface k = 0.0000
A4 = −1.9874e−005, A6 = −1.1876e−007, A8 = 1.0444e−008,
A10 = −7.8229e−011, A12 = 0.0000e+000, A14 = 0.0000e+000,
A16 = 0.0000e+000, A18 = 0.0000e+000, A20 = 0.0000e+000

8th surface k = 0.0000
A4 = 5.3496e−005, A6 = 4.5115e−008, A8 = 7.8811e−009,
A10 = −8.2069e−011, A12 = 0.0000e+000, A14 = 0.0000e+000,
A16 = 0.0000e+000, A18 = 0.0000e+000, A20 = 0.0000e+000

12th surface k = 0.0000
A4 = −1.4845e−005, A6 = −2.2847e−007, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000

16th surface k = 0.0000
A4 = 4.8248e−004, A6 = −2.1341e−005, A8 = 7.3065e−007,
A10 = −1.0038e−008, A12 = 0.0000e+000, A14 = 0.0000e+000,
A16 = 0.0000e+000, A18 = 0.0000e+000, A20 = 0.0000e+000

17th surface k = 0.0000
A4 = 5.4853e−004, A6 = −2.0589e−005, A8 = 6.4057e−007,
A10 = −7.7778e−009, A12 = 0.0000e+000, A14 = 0.0000e+000,
A16 = 0.0000e+000, A18 = 0.0000e+000, A20 = 0.0000e+000

18th surface k = 0.0000
A4 = −1.7591e−006, A6 = 2.6088e−007, A8 = 4.5581e−010,
A10 = −6.3037e−012, A12 = 0.0000e+000, A14 = 0.0000e+000,
A16 = 0.0000e+000, A18 = 0.0000e+000, A20 = 0.0000e+000

19th surface k = 0.0000
A4 = 7.3591e−007, A6 = 1.1835e−007, A8 = 1.8792e−009,
A10 = −1.0374e−011, A12 = 0.0000e+000, A14 = 0.0000e+000,
A16 = 0.0000e+000, A18 = 0.0000e+000, A20 = 0.0000e+000

Zoom data

| | WE | ST | TE |
|---|---|---|---|
| f (mm) | 12.240 | 26.827 | 58.800 |
| FNO. | 3.570 | 4.670 | 6.411 |
| 2ω (Angle of field) | 91.0 | 44.3 | 21.3 |
| FB (mm) | 14.201 | 14.201 | 14.201 |
| IH | 11.15 | 11.15 | 11.15 |
| Lens total length | 69.408 | 60.664 | 69.407 |
| d6 | 31.436 | 10.836 | 0.432 |
| d13 | 1.351 | 6.338 | 16.232 |
| d17 | 7.902 | 14.771 | 24.024 |

Unit focal length f1 = −18.7216   f2 = 16.3222   f3 = −19.0771   f4 = 38.6992

EXAMPLE 5

| Unit mm | | | | |
|---|---|---|---|---|
| Surface data | | | | |
| Surface no. | r | d | nd | νd |
| Object plane | ∞ | ∞ | | |
| 1 | 29.848 | 0.800 | 1.88300 | 40.80 |
| 2 | 11.140 | 5.015 | | |
| 3* | 1984.401 | 1.000 | 1.62263 | 58.16 |
| 4* | 16.340 | 0.700 | | |
| 5 | 21.277 | 2.585 | 1.84666 | 23.78 |
| 6 | 97.119 | Variable | | |
| 7* | 13.066 | 2.415 | 1.82080 | 42.71 |
| 8 | 500.000 | 0.400 | 1.80518 | 25.42 |
| 9* | 156.306 | 1.285 | | |
| 10 (Stop) | ∞ | 1.000 | | |
| 11 | 25.322 | 1.055 | 1.80000 | 29.84 |
| 12 | 7.246 | 3.754 | 1.49700 | 81.54 |
| 13 | −21.771 | 0.250 | | |
| 14 | 66.440 | 1.000 | 1.49700 | 81.54 |
| 15 | 48.900 | Variable | | |
| 16* | 505.239 | 1.000 | 1.61881 | 63.85 |
| 17* | 13.517 | Variable | | |
| 18* | −157.716 | 3.653 | 1.72903 | 54.04 |
| 19* | −23.343 | 11.15 | | |
| Image plane (Image pickup surface) | ∞ | | | |
| Stop surface | 10 | | | |

Aspherical surface data

3rd surface k = 0.0000
A4 = −3.9379e−004, A6 = 1.0647e−005, A8 = −1.6978e−007,
A10 = 1.4500e−009, A12 = −5.1500e−012, A14 = 0.0000e+000,
A16 = 0.0000e+000, A18 = 0.0000e+000, A20 = 0.0000e+000

4th surface k = 0.0000
A4 = −4.5183e−004, A6 = 1.1467e−005, A8 = −1.9507e−007,
A10 = 1.7598e−009, A12 = −6.6344e−012, A14 = 0.0000e+000,
A16 = 0.0000e+000, A18 = 0.0000e+000, A20 = 0.0000e+000

7th surface k = 0.0000
A4 = −7.5000e−006, A6 = 4.4000e−007, A8 = −3.4902e−009,
A10 = 3.0475e−011, A12 = −1.0000e−013, A14 = 0.0000e+000,
A16 = 0.0000e+000, A18 = 0.0000e+000, A20 = 0.0000e+000

9th surface k = 0.0000
A4 = 6.1702e−005, A6 = 6.0143e−007, A8 = −1.0191e−008,
A10 = 8.6614e−011, A12 = 0.0000e+000, A14 = 0.0000e+000,
A16 = 0.0000e+000, A18 = 0.0000e+000, A20 = 0.0000e+000

16th surface k = 0.0000
A4 = 1.4476e−004, A6 = −8.0102e−006, A8 = 3.2317e−007,
A10 = −4.3184e−009, A12 = 0.0000e+000, A14 = 0.0000e+000,
A16 = 0.0000e+000, A18 = 0.0000e+000, A20 = 0.0000e+000

-continued

| Unit mm |
|---|

17th surface k = 0.0000
A4 = 2.0586e−004, A6 = −7.8912e−006, A8 = 2.3579e−007,
A10 = −2.1593e−009, A12 = 0.0000e+000, A14 = 0.0000e+000,
A16 = 0.0000e+000, A18 = 0.0000e+000, A20 = 0.0000e+000
18th surface k = 0.0000
A4 = −6.2356e−005, A6 = 8.0243e−007, A8 = −2.9536e−009,
A10 = −2.1108e−012, A12 = 0.0000e+000, A14 = 0.0000e+000,
A16 = 0.0000e+000, A18 = 0.0000e+000, A20 = 0.0000e+000
19th surface k = 0.0000
A4 = −5.2173e−005, A6 = 5.3860e−007, A8 = −2.4108e−010,
A10 = −1.0254e−011, A12 = 0.0000e+000, A14 = 0.0000e+000,
A16 = 0.0000e+000, A18 = 0.0000e+000,
A20 = 0.0000e+000

| Zoom data | | | |
|---|---|---|---|
| | WE | ST | TE |
| f (mm) | 12.192 | 24.461 | 48.993 |
| FNO. | 3.519 | 4.634 | 6.392 |
| 2ω (Angle of field) | 91.3 | 48.3 | 24.9 |
| FB (mm) | 13.535 | 13.535 | 13.535 |
| IH | 11.15 | 11.15 | 11.15 |
| Lens total length | 59.307 | 55.551 | 62.609 |
| d6 | 24.200 | 9.114 | 0.400 |
| d15 | 1.426 | 5.556 | 14.326 |
| d17 | 7.769 | 14.969 | 21.971 |

| Unit focal length | | | |
|---|---|---|---|
| f1 = −17.9851 | f2 = 15.4541 | f3 = −22.4611 | f4 = 37.156 |

EXAMPLE 6

| Unit mm |
|---|

| Surface data | | | | |
|---|---|---|---|---|
| Surface no. | r | d | nd | νd |
| Object plane | ∞ | ∞ | | |
| 1* | −43.488 | 0.800 | 1.82080 | 42.71 |
| 2* | 11.867 | 3.936 | | |
| 3* | 37.343 | 2.186 | 1.92286 | 20.88 |
| 4* | 1263.052 | Variable | | |
| 5* | 11.230 | 2.998 | 1.60224 | 55.05 |
| 6* | −40.577 | 1.000 | | |
| 7 (Stop) | ∞ | 2.210 | | |
| 8 | 26.346 | 0.400 | 1.80610 | 33.27 |
| 9 | 7.205 | 3.368 | 1.49700 | 81.54 |
| 10* | −43.916 | Variable | | |
| 11* | 28.133 | 0.500 | 1.80139 | 45.45 |
| 12* | 10.777 | Variable | | |
| 13* | −51.856 | 4.094 | 1.72903 | 54.04 |
| 14* | −16.091 | 14.311 | | |
| Image plane (Image pickup surface) | ∞ | | | |
| Stop surface | 7 | | | |

| Aspherical surface data |
|---|

1st surface k = 0.0000
A4 = 2.2661e−005, A6 = −3.8964e−008, A8 = 4.7185e−010,
A10 = 0.0000e+000, A12 = 0.0000e+000, A14 = 0.0000e+000,
A16 = 0.0000e+000, A18 = 0.0000e+000, A20 = 0.0000e+000
2nd surface k = 0.0000
A4 = −7.5506e−005, A6 = 8.1074e−008, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
3rd surface k = 0.0000
A4 = 2.8136e−005, A6 = 5.8890e−007, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
4th surface k = 0.0000
A4 = 1.4019e−005, A6 = 4.7514e−007, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
5th surface k = 0.0000
A4 = −6.2463e−005, A6 = 2.8943e−008, A8 = −3.4348e−009,
A10 = 0.0000e+000, A12 = 0.0000e+000, A14 = 0.0000e+000,
A16 = 0.0000e+000, A18 = 0.0000e+000, A20 = 0.0000e+000
6th surface k = 0.0000
A4 = 7.5963e−005, A6 = −1.5625e−007, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
10th surface k = 0.0000
A4 = −2.9990e−005, A6 = 1.0192e−006, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
11th surface k = 0.0000
A4 = −8.0000e−005, A6 = 0.0000e+000, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
12th surface k = 0.0000
A4 = −3.0829e−005, A6 = −1.3812e−006, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
13th surface k = 0.0000
A4 = 6.2013e−005, A6 = 1.4500e−008, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
14th surface k = 0.0000
A4 = 7.6527e−005, A6 = 4.1021e−008, A8 = 6.2359e−010,
A10 = 0.0000e+000, A12 = 0.0000e+000, A14 = 0.0000e+000,
A16 = 0.0000e+000, A18 = 0.0000e+000, A20 = 0.0000e+000

| Zoom data | | | |
|---|---|---|---|
| | WE | ST | TE |
| f (mm) | 12.240 | 21.899 | 39.200 |
| FNO. | 3.596 | 4.202 | 5.642 |
| 2ω (Angle of field) | 91.9 | 51.3 | 30.0 |
| FB (mm) | 14.311 | 14.311 | 14.311 |
| IH | 11.15 | 11.15 | 11.15 |
| Lens total length | 51.405 | 46.288 | 52.423 |
| d4 | 21.113 | 8.132 | 0.981 |

-continued

| Unit mm | | | |
|---|---|---|---|
| d10 | 1.672 | 6.263 | 13.071 |
| d12 | 7.128 | 10.401 | 16.879 |

| Unit focal length | | | |
|---|---|---|---|
| f1 = −17.8212 | f2 = 15.2892 | f3 = −22.0803 | f4 = 30.5296 |

EXAMPLE 7

| Unit mm | | | | |
|---|---|---|---|---|
| Surface data | | | | |
| Surface no. | r | d | nd | vd |
| Object plane | ∞ | ∞ | | |
| 1 | 42.388 | 0.800 | 1.91082 | 35.25 |
| 2 | 10.866 | 4.919 | | |
| 3* | −35.740 | 0.700 | 1.53071 | 55.69 |
| 4* | 42.181 | 4.919 | | |
| 5 | 26.184 | 2.261 | 1.92286 | 20.88 |
| 6 | 246.622 | Variable | | |
| 7* | 10.848 | 2.697 | 1.80610 | 40.88 |
| 8* | −165.898 | 1.098 | | |
| 9 (Stop) | ∞ | 1.000 | | |
| 10 | 30.704 | 0.500 | 1.91082 | 29.81 |
| 11 | 6.223 | 3.804 | 1.49700 | 81.54 |
| 12* | −19.508 | Variable | | |
| 13* | 1027.929 | 0.600 | 1.53071 | 55.69 |
| 14* | 11.297 | Variable | | |
| 15 | −331.164 | 3.110 | 1.78800 | 47.37 |
| 16 | −27.421 | 14.453 | | |
| Image plane (Image pickup surface) | ∞ | | | |
| Stop surface | 9 | | | |

Aspherical surface data

3rd surface k = −5.7140
A4 = 8.7980e−005, A6 = −1.0196e−006, A8 = 2.4374e−009,
A10 = −2.2659e−011, A12 = 0.0000e+000, A14 = 0.0000e+000,
A16 = 0.0000e+000, A18 = 0.0000e+000, A20 = 0.0000e+000
4th surface k = −27.3562
A4 = 1.0193e−004, A6 = −1.3941e−006, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
7th surface k = −0.5503
A4 = 4.8646e−006, A6 = −2.0238e−009, A8 = 2.8694e−009,
A10 = −5.9963e−011, A12 = 0.0000e+000, A14 = 0.0000e+000,
A16 = 0.0000e+000, A18 = 0.0000e+000, A20 = 0.0000e+000
8th surface k = −999.0108
A4 = 3.8182e−005, A6 = 0.0000e+000, A8 = 0.0000e+000,
A10 = 0.0000e+000, A12 = 0.0000e+000, A14 = 0.0000e+000,
A16 = 0.0000e+000, A18 = 0.0000e+000, A20 = 0.0000e+000
12th surface k = 10.3337
A4 = 1.1452e−004, A6 = 2.8014e−006, A8 = −6.9732e−008,
A10 = 2.8700e−009, A12 = 0.0000e+000, A14 = 0.0000e+000,
A16 = 0.0000e+000, A18 = 0.0000e+000, A20 = 0.0000e+000
13th surface k = 0.0000
A4 = −2.9811e−005, A6 = −5.3136e−007, A8 = 0.0000e+000, -continued

| Unit mm |
|---|
| A10 = 0.0000e+000, A12 = 0.0000e+000, A14 = 0.0000e+000, A16 = 0.0000e+000, A18 = 0.0000e+000, A20 = 0.0000e+000 |
| 14th surface |
| k = 2.2896 A4 = −2.0726e−004, A6 = −5.0181e−006, A8 = −8.7995e−008, A10 = −3.2799e−009, A12 = 1.8965e−010, A14 = 0.0000e+000, A16 = 0.0000e+000, A18 = 0.0000e+000, A20 = 0.0000e+000 |

| Zoom data | | | |
|---|---|---|---|
| | WE | ST | TE |
| f (mm) | 12.212 | 21.875 | 39.172 |
| FNO. | 3.597 | 4.398 | 5.743 |
| 2ω (Angle of field) | 92.4 | 54.1 | 30.9 |
| FB (mm) | 14.453 | 14.454 | 14.453 |
| IH | 11.15 | 11.15 | 11.15 |
| Lens total length | 58.605 | 52.908 | 56.039 |
| d6 | 22.857 | 9.059 | 0.772 |
| d12 | 0.943 | 4.247 | 10.024 |
| d14 | 8.397 | 13.194 | 18.835 |

| Unit focal length | | | |
|---|---|---|---|
| f1 = −18.4309 | f2 = 14.7045 | f3 = −21.5284 | f4 = 37.7686 |

Aberration diagrams of examples from the example 1 to the example 7 are shown in diagrams from FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') to FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L (hereinafter, 'FIG. 14A to FIG. 14L'). Each of the aberration diagrams is an aberration diagram when focused to an object at infinity. Moreover, in each diagram, 'FIY' denotes the maximum image height.

In the aberration diagrams, FIG. 8A, FIG. 9A, FIG. 10A, FIG. 11A, FIG. 12A, FIG. 13A, and FIG. 14A show a spherical aberration (SA) at the wide angle end, FIG. 8B, FIG. 9B, FIG. 10B, FIG. 11B, FIG. 12B, FIG. 13B, and FIG. 14B show an astigmatism (AS) at the wide angle, FIG. 8C, FIG. 9C, FIG. 10C, FIG. 11C, FIG. 12C, FIG. 13C, and FIG. 14C show a distortion (DT) at the wide angle end, and FIG. 8D, FIG. 9D, FIG. 10D, FIG. 11D, FIG. 12D, and FIG. 13D, and FIG. 14D show a chromatic aberration of magnification (CC) at the wide angle end.

Moreover, FIG. 8E, FIG. 9E, FIG. 10E, FIG. 11E, FIG. 12E, FIG. 13E, and FIG. 14E show a spherical aberration (SA) in the intermediate focal length state, FIG. 8F, FIG. 9F, FIG. 10F, FIG. 11F, FIG. 12F, FIG. 13F, and FIG. 14F show an astigmatism (AS) in the intermediate focal length state, FIG. 8G, FIG. 9G, FIG. 10G, FIG. 11G, FIG. 12G, FIG. 13G, and FIG. 14G show a distortion (DT) in the intermediate focal length state, and FIG. 8H, FIG. 9H, FIG. 10H, FIG. 11H, FIG. 12H, FIG. 13H, and FIG. 14H show a chromatic aberration of magnification (CC) in the intermediate focal length state.

Furthermore, FIG. 8I, FIG. 9I, FIG. 10I, FIG. 11I, FIG. 12I, FIG. 13I, and FIG. 14I show a spherical aberration (SA) at the telephoto end, FIG. 8J, FIG. 9J, FIG. 10J, FIG. 11J, FIG. 12J, FIG. 13J, and FIG. 14J show an astigmatism (AS) at the telephoto end, FIG. 8K, FIG. 9K, FIG. 10K, FIG. 11K, FIG. 12K, FIG. 13K, and FIG. 14K show a distortion (DT) at the telephoto end, and FIG. 8L, FIG. 9L, FIG. 10L, FIG. 11L, FIG. 12L, FIG. 13L, and FIG. 14L show a chromatic aberration of magnification (CC) at the telephoto end.

Next, values of conditional expressions (1) to (21) in each example are given below. Specific gravity is a value for the negative lens in the third lens unit. Moreover, a hyphen (-) indicates that there is no arrangement for calculating the value. Material name denoted by 'COP' is a cyclo-olefin polymer.

| Conditional expression |
| --- |
| (1) $IH_{MAX}/f_w$ |
| (2) $DT_w$ |
| (3) $|f_3/ER_s|$ |
| (4) $f_{UN21}/ER_s$ |
| (5) $f_{UN21}/f_2$ |
| (6) $|f_3/f_w|$ |
| (7) $|f_3/IH_{39w}|$ |
| (8) $SF_{UN21}$ |
| (9) $\Sigma_{2G}/f_w$ |
| (10) $|f_3/f_2|$ |
| (11) $|f_3/IH_{MAX}|$ |
| Specific weight of negative lens (g/cm³) |
| (12) $\nu_{p1}$ |
| (13) $SF_{2N}$ |
| (14) $fb_w/IH_{MAX}$ |
| (15) $f_1/f_3$ |
| (16) $\Sigma_{2G}/f_2$ |
| (17) $LTL_w/fb_w$ |
| (18) $f_{UN21}/f_w$ |
| (19) $\Delta D_{12}/f_T$ |
| (20) $IH_{39w}/f_w$ |
| (21) $f_t/f_w$ |

| | Example 1 | Example 2 | Example 3 | Example 4 |
| --- | --- | --- | --- | --- |
| Conditional expression | | | | |
| (1) | 0.91 | 0.91 | 0.91 | 0.91 |
| (2) | −10.78 | −11.02 | −11.09 | −10.47 |
| (3) | 0.722 | 0.605 | 0.849 | 0.595 |
| (4) | 2.435 | 2.845 | 3.148 | 2.27 |
| (5) | 0.93 | 0.96 | 1.12 | 0.95 |
| (6) | 1.54 | 1.75 | 1.84 | 1.56 |
| (7) | 2.071 | 2.354 | 2.476 | 2.098 |
| (8) | −0.62 | −0.63 | −1.18 | −0.84 |
| (9) | 0.76 | 0.79 | 0.88 | 0.88 |
| (10) | 1.33 | 1.42 | 1.45 | 1.17 |
| (11) | 1.69 | 1.92 | 2.01 | 1.71 |
| Third lens unit | | | | |
| Specific weight of negative lens (g/cm³) | 1.01 | 1.01 | 3.57 | 2.67/4.28 |
| Material name | COP | COP | M-PCD4 | S-TIM3/ M-TAC80 |
| (12) | 81.54 | 81.54 | 81.54 | 81.54 |
| (13) | 0.6 | 0.94 | 1.02 | 1.13 |
| (14) | 1.29 | 1.25 | 1.27 | 1.27 |
| (15) | 0.85 | 0.79 | 0.8 | 0.98 |
| (16) | 0.66 | 0.64 | 0.7 | 0.66 |
| (17) | 4.69 | 4.78 | 5.15 | 5.89 |
| (18) | 1.07 | 1.19 | 1.41 | 1.26 |
| (19) | 0.49 | 0.51 | 0.49 | 0.53 |
| (20) | 0.744 | 0.744 | 0.741 | 0.743 |
| (21) | 3.364 | 3.203 | 3.987 | 4.804 |

| | Example 5 | Example 6 | Example 7 |
| --- | --- | --- | --- |
| Conditional expression | | | |
| (1) | 0.91 | 0.91 | 0.91 |
| (2) | −10.61 | −11.81 | −12.41 |
| (3) | 0.849 | 0.53 | 0.59 |
| (4) | 3.14 | 2.93 | 2.57 |
| (5) | 1.11 | 0.98 | 0.86 |
| (6) | 1.84 | 1.80 | 1.76 |
| (7) | 2.477 | 2.409 | 2.392 |
| (8) | −1.18 | −0.57 | −0.88 |
| (9) | 0.92 | 0.82 | 0.75 |
| (10) | 1.45 | 1.44 | 1.46 |
| (11) | 2.01 | 1.98 | 1.93 |
| Third lens unit | | | |
| Specific weight of negative lens (g/cm³) | 3.57 | 4.84 | 1.01 |
| Material name | M-PCD4 | M-TAF31 | COP |
| (12) | 81.54 | 81.54 | 81.54 |
| (13) | 1.02 | — | −0.08 |
| (14) | 1.21 | 1.28 | 1.3 |
| (15) | 0.8 | 0.81 | 0.86 |
| (16) | 0.72 | 0.65 | 0.62 |
| (17) | 5.38 | 4.59 | 4.75 |
| (18) | 1.41 | 1.22 | 1.04 |
| (19) | 0.49 | 0.51 | 0.56 |
| (20) | 0.744 | 0.749 | 0.737 |
| (21) | 4.018 | 3.203 | 3.208 |

M-PCD 4 is a product manufactured by HOYA Corporation, S-TIM 3 is a product manufactured by OHARA Inc., M-TAC 80 is a product manufactured by HOYA Corporation, M-TAF 31 is a product manufactured by HOYA Corporation, and cyclo-olefin polymer is a product manufactured by Nippon ZEON Co., Ltd.

Figure 16:
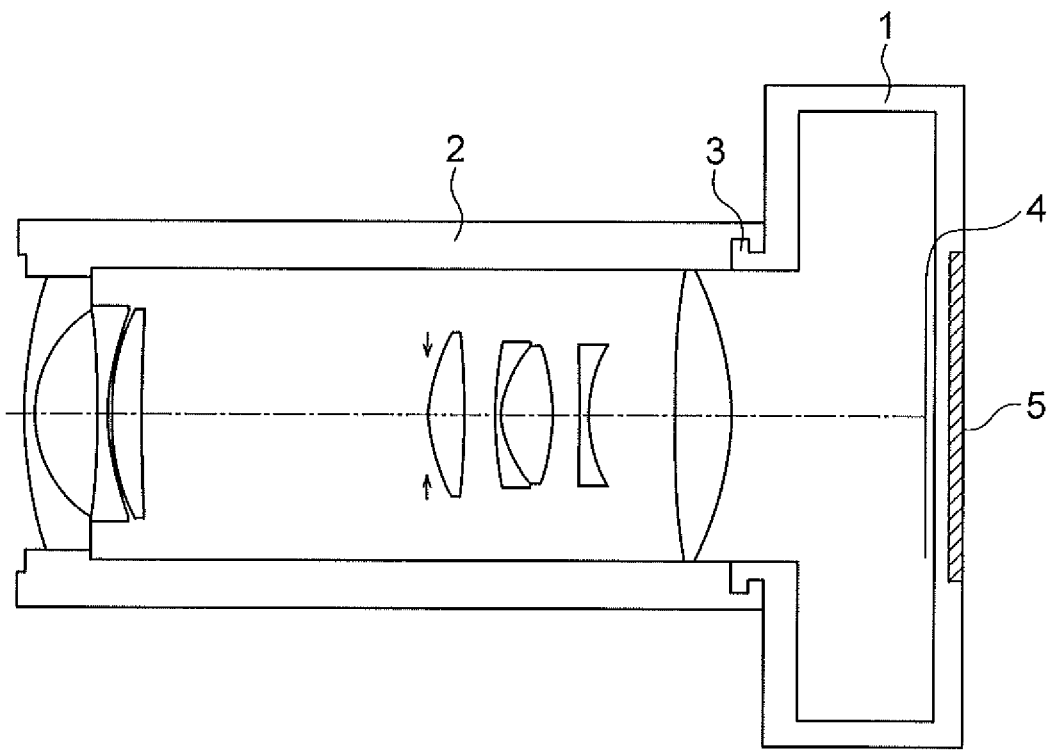
FIG. 16 is a cross-sectional view of an image pickup apparatus.

FIG. 16 is a cross-sectional view of an interchangeable lens camera such as a mirrorless single-lens camera, as an electronic image pickup apparatus. The mirrorless single-lens camera is a camera of a type which does not have a quick-return mirror. In FIG. 16, a photographic optical system 2 is disposed inside a lens barrel of a mirrorless single-lens camera 1. A mounting portion 3 enables to attach and detach the photographic lens system 2 to and from a body of the mirrorless single-lens camera 1. A mounting of a screw-type or a bayonate type is used as the mounting portion 3. In this example, a mounting of the bayonate type is used. Moreover, an image pickup element surface 4 and a back monitor 5 are disposed on the body of the mirrorless single-lens camera 1. A small-size CCD (charge coupled device) or a CMOS (complementary metal oxide semiconductor) is used as the image pickup element.

Moreover, the zoom lens according to one of the examples from the example 1 to the example 7 is used as the photographic optical system 2 of the mirrorless single-lens camera 1.

Figure 17:
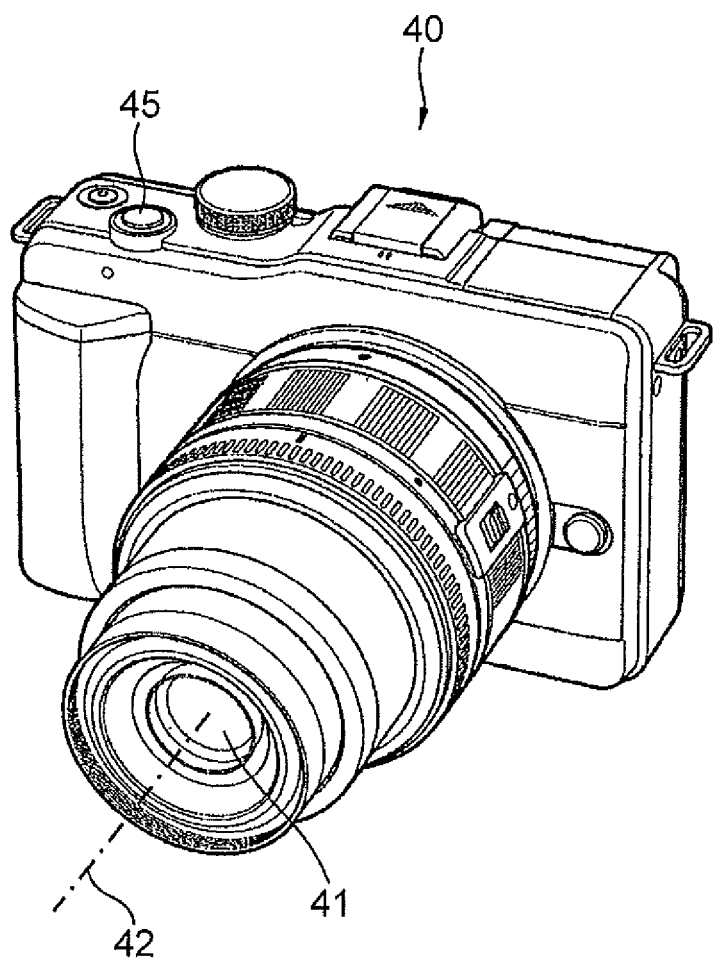
FIG. 17 is a front perspective view showing an appearance of the image pickup apparatus according to the present invention.
Figure 18:
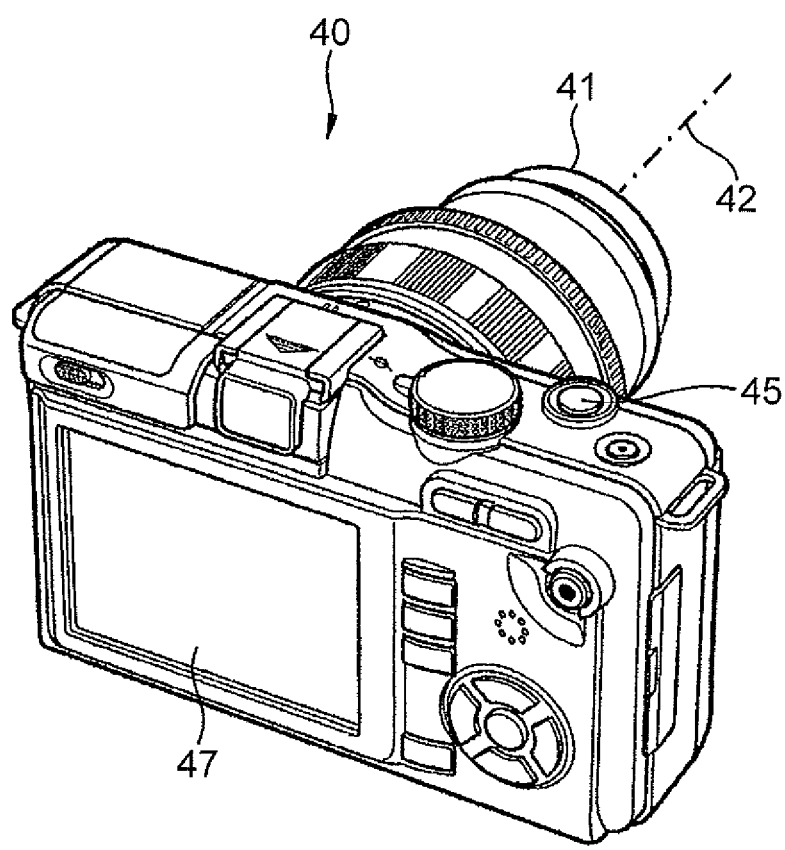
FIG. 18 is a rear perspective view of the image pickup apparatus.

FIG. 17 and FIG. 18 are conceptual diagrams of an arrangement of an image pickup apparatus including the zoom lens according to the present example. FIG. 17 is a front perspective view showing an appearance of a mirrorless single-lens camera 40 as the image pickup apparatus, and FIG. 18 is a rear perspective view showing an appearance of the mirrorless single-lens camera 40. The zoom lens according to the present example is used for a photographic optical system 41 of the mirrorless single-lens camera 40.

The mirrorless single-lens camera 40 according to this embodiment includes the photographic optical system 41 positioned on an optical path for photography (hereinafter, 'photography optical path') 42, a shutter button 45, and a liquid-crystal display monitor 47. As the shutter button 45 disposed on an upper portion of the mirrorless single-lens camera 40 is pressed, capturing is carried out through the zoom lens of the example 1 in conjunction with the pressing of the shutter button 45. An object image formed by the photographic optical system 41 is formed on the image pickup element (photoelectric conversion surface) provided near an image forming surface. The object image received by the image pickup element is displayed on the liquid-crystal display monitor 47 provided on a rear surface of the camera, as an electronic image by a processing unit. Moreover, it is possible to record the electronic image captured in a storage unit.

Figure 19:
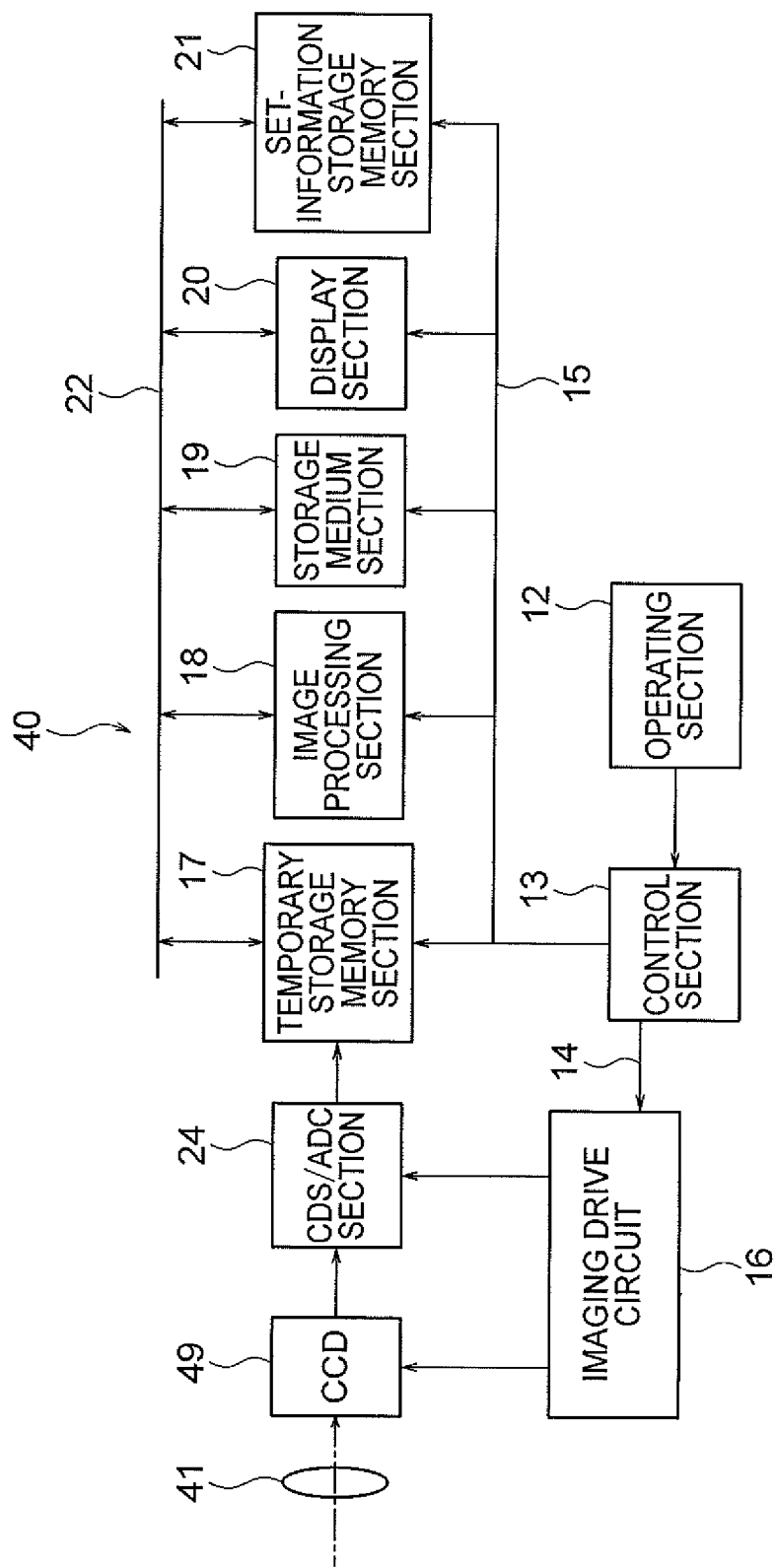
FIG. 19 is a block diagram of a configuration of an internal circuit of main components of the image pickup apparatus.

FIG. 19 is a block diagram showing a configuration of an internal circuit of main components of the mirrorless single-lens camera 40. In the following description, the aforementioned processing unit includes a CDS/ADC (correlated double sampling/analog-to-digital converter) section 24, a temporary storage memory 17, and an image processing section 18. The storage unit includes a storage medium section 19.

As shown in FIG. 19, the mirrorless single-lens camera 40 includes an operating section 12, a control section 13 connected to the operating section 12, and an image pickup drive circuit 16, the temporary storage memory 17, the image processing section 18, the storage medium section 19, a display section 20, and a setting-information storage memory section 21 which are connected to control-signal output port of the control section 13 via buses 14 and 15.

The temporary storage memory 17, the image processing section 18, the storage medium section 19, the display section 20, and the setting-information storage memory section 21 are subjected to input and output of data mutually via a bus 22. Moreover, a CCD 49 and the CDS/ADC section 24 are connected to the image pickup drive circuit 16.

The operating section 12 includes various input buttons and switches. Event information to be input from an outside (by a user of the camera) is notified to the control section 13 via these input buttons and switches. The control section 13 is a unit such as a CPU (central processing unit). The CPU has a built-in computer program memory not shown in the diagram, and controls the overall mirrorless single-lens camera 40 according to a computer program stored in the computer program memory.

The CCD 49 is an image pickup element which is controlled and driven by the image pickup drive circuit 16 to convert an amount of light for each pixel of the object image formed via the photographic optical system 41, to an electric signal, and to output to the CDC/ADC section 24.

The CDS/ADC section 24 is a circuit that amplifies an electric signal input from the CCD 49, as well as carries out analog/digital conversion of the electric signal, and outputs image raw data (bayer data, hereinafter, called as 'RAW data') subjected to amplification and digital conversion, to the temporary storage memory 17.

The temporary storage memory 17 is a buffer which includes a memory such as an SDRAM (synchronous dynamic random access memory), and is a memory which stores temporarily the RAW data output from the CDS/ADC 24. The image processing circuit 18 is a circuit which reads the RAW data that has been stored in the temporary storage memory 17 or the RAW data that has been stored in the storage medium section 19, and carries out various image processing electrically, including correction of distortion based on image-quality parameters specified in the control section 13.

The storage medium section 19 has a detachably installed storage memory of a card-type or a stick-type including a memory such as a flash memory, and holds upon recording, RAW data transferred from the temporary storage memory 17 and image data subjected to image processing in the image processing section 18.

The display section 20 includes components such as the liquid-crystal display monitor 47, and displays the RAW data captured, the image data, and an operation menu. The setting-information storage memory section 21 includes a ROM section in which, the image-quality parameters have been stored in advance, and a RAM section which stores the image-quality parameters read from the ROM section by an input operation on the operating section 122.

It is possible to let the mirrorless single-lens camera 40 arranged in such manner to be an image pickup apparatus which includes a zoom lens in which, both, the favorable correction of various aberrations and small-sizing are achieved. It is possible to use the zoom lens according to the present invention also in an image pickup apparatus of a type in which, an optical system is fixed to a main body of the image pickup apparatus.

In such manner, the present invention is suitable for a zoom lens in which, both, the favorable correction of various aberrations and small-sizing are achieved, and an image pickup apparatus using such zoom lens.

According to the present invention, it is possible to provide a zoom lens in which, both, the favorable correction of various aberrations and small-sizing are achieved, and an image pickup apparatus using such zoom lens.

What is claimed is:

1. A zoom lens comprising in order from an object side to an image side:
   a first lens unit having a negative refractive power;
   a second lens unit having a positive refractive power; and
   a third lens unit having a negative refractive power, wherein
   at the time of zooming, distances between the lens units change, and
   a distance between the first lens unit and the second lens unit at a telephoto end is shorter than a distance between the first lens unit and the second lens unit at a wide angle end, and
   an aperture stop is disposed on an image side of an image-side surface of the first lens unit, and on an object side of an image-side surface of the second lens unit, and
   the zoom lens satisfies the following conditional expressions (1), (2), and (3)

$$0.83 < IH_{MAX}/f_W < 1.2 \quad (1)$$

$$-20.0\% < DT_W < -6.0\% \quad (2)$$

$$0.35 < |f_3/ER_S| < 1.05 \quad (3)$$

where,
$IH_{MAX}$ denotes the maximum image height, and denotes the maximum value in a case in which, the maximum image height changes with zooming,
$f_W$ denotes a focal length of the overall zoom lens system at the time of infinite object point focusing, at the wide angle end, $$DT_W = \{IH_W - f_W \times \tan(\omega_W)\}/\{f_W \times \tan(\omega_W)\} \times 100(\%),$$

$f_W$ denotes the focal length of the overall zoom lens system at the time of infinite object point focusing at the wide angle end,
$IH_W$ denotes the maximum image height at the time of infinite object point focusing at the wide angle end,
$\omega_W$ denotes a half angle of view at the time of infinite object point focusing at the wide angle end,
$f_3$ denotes a focal length of the third lens unit, and
$ER_S$ denotes the maximum radius of an opening portion of the aperture stop.

2. The zoom lens according to claim 1, comprising:
   a fourth lens unit having a positive refractive power, disposed on the image side of the third lens unit, where
   at the time of zooming, a distance between the third lens unit and the fourth lens unit changes.

3. The zoom lens according to claim 2, wherein a distance between the third lens unit and the fourth lens unit at the telephoto end widens with respect to a distance between the third lens unit and the fourth lens unit at the wide angle end.

4. The zoom lens according to claim 2, wherein the zoom lens is a four-unit zoom lens with the total number of lens units in the zoom lens four, namely, the first lens unit, the second lens unit, the third lens unit, and the fourth lens unit.

5. The zoom lens according to claim 1, wherein the zoom lens satisfies the following conditional expression (3)

$$0.35<|f_3/ER_S|<1.05 \qquad (3)$$

where, $f_3$ denotes a focal length of the third lens unit, and
$ER_S$ denotes the maximum radius of an opening portion of the aperture stop.

6. The zoom lens according to claim 1, wherein the zoom lens satisfies the following conditional expression (7)

$$1.6<|f_3/IH_{39W}|<3.9 \qquad (7)$$

where, $f_3$ denotes a focal length of the third lens unit, and
$IH_{39W}$ denotes a distance from an optical axis, of a position at which a principal light ray for which, a half angle of field on an incidence side of the zoom lens at the time of focusing at infinity on an optical axis at the wide angle end becomes 39°, intersects with a paraxial image plane.

7. The zoom lens according to claim 1, wherein the zoom lens satisfies the following conditional expression (6)

$$1.15<|f_3/f_W|<2.5 \qquad (6)$$

where, $f_3$ denotes a focal length of the third lens unit, and
$f_W$ denotes a focal length of the overall zoom lens system at the time of infinite object point focusing, at the wide angle end.

8. The zoom lens according to claim 1, wherein the zoom lens satisfies the following conditional expression (2)

$$-20.0\%<DT_W<-6.0\% \qquad (2)$$

where, $$DT_W=\{IH_W-f_W\times\tan(\omega_W)\}/\{f_W\times\tan(\omega_W)\}\times 100(\%),$$

$f_W$ denotes a focal length of the overall zoom lens system at the time of infinite object point focusing at the wide angle end,
$IH_W$ denotes the maximum image height at the time of infinite object point focusing at the wide angle end, and
$\omega_W$ denotes a half angle of view at the time of infinite object point focusing at the wide angle end.

9. The zoom lens according to claim 1, wherein
the second lens unit includes two sub lens units namely, an object-side sub lens unit having a positive refractive power, which is a lens unit disposed nearest to the object side in the second lens unit, and an image-side sub lens unit disposed on the image side of the object-side sub lens unit in the second lens unit, and
the object-side sub lens unit in the second lens unit includes one lens component, and
only two surfaces of the lens component, namely, the object-side surface and the image-side surface, are in contact with air in the optical path, and
the zoom lens satisfies the following conditional expression (8)

$$-1.5<SF_{UN21}<0.5 \qquad (8)$$

where, $$SF_{UN21}=(R_{UN21O}+R_{UN21I})/(R_{UN21O}-R_{UN21I})$$

$R_{UN21O}$ denotes a paraxial radius of curvature of an object-side surface of the object-side sub lens unit in the second lens unit, and
$R_{UN21I}$ denotes a paraxial radius of curvature of an image-side surface of the object-side sub lens unit in the second lens unit.

10. The zoom lens according to claim 1, wherein the zoom lens satisfies the following conditional expression (9)

$$0.45<\Sigma_{2G}/f_W<1.1 \qquad (9)$$

where, $\Sigma_{2G}$ denotes a thickness of the second lens unit on an optical axis, and
$f_W$ denotes a focal length of the overall zoom lens system at the time of infinite object point focusing at the wide angle end.

11. The zoom lens according to claim 1, wherein
the second lens unit includes two sub lens units namely, an object-side sub lens unit having a positive refractive power, which is a lens unit disposed nearest to the object side in the second lens unit, and an image-side sub lens unit disposed on the image side of the object-side sub lens unit in the second lens unit, and
the object-side sub lens unit in the second lens unit includes one lens component, and
only two surfaces of the lens component namely, the object-side surface and the image-side surface, are in contact with air in the optical path, and
the image-side sub lens unit in the second lens unit includes a lens surface having a negative refractive power and a positive lens which is disposed on the image side of the lens surface.

12. The zoom lens according to claim 1, wherein the zoom lens satisfies the following conditional expression (10)

$$1.0<|f_3/f_2|<1.9 \qquad (10)$$

where, $f_2$ denotes a focal length of the second lens unit, and
$f_3$ denotes a focal length of the third lens unit.

13. The zoom lens according to claim 1, wherein the zoom lens satisfies the following conditional expression (11)

$$1.3<|f_3/IH_{MAX}|<2.5 \qquad (11)$$

where, $f_3$ denotes the focal length of the third lens unit, and
$IH_{MAX}$ denotes the maximum image height, and denotes the maximum value in a case in which, the maximum image height changes with zooming.

14. The zoom lens according to claim 1, wherein the third lens unit includes a lens having a specific gravity more than 0.9 g/cm³ and smaller than 1.3 g/cm³.

15. The zoom lens according to claim 1, wherein the second lens unit includes a negative lens, and a positive lens that satisfies the following conditional expression (12)

$$63<\nu_{p1}<96 \qquad (12)$$

where, $\nu_{p1}$ denotes Abbe's number for a d-line of one of the positive lenses in the second lens unit.

16. The zoom lens according to claim 1, wherein the first lens unit includes in order from the object side to the image side, an object-side sub lens unit which includes a first negative lens, and an image-side sub lens unit which includes a second negative lens and a first positive lens.

17. The zoom lens according to claim 16, wherein the zoom lens satisfies the following conditional expression (13)

$$-0.9<SF_{2N}<1.5 \qquad (13)$$

where, $$SF_{2N}=(R_{2NO}+R_{2NI})/(R_{2NO}-R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

18. The zoom lens according to claim 1, wherein the zoom lens satisfies the following conditional expression (14)

$$0.6<fb_W/IH_{MAX}<1.8 \quad (14)$$

where, $fb_W$ denotes an air-converted back-focus at the time of infinite object point focusing at the wide angle end, and $IH_{MAX}$ denotes the maximum image height, and denotes the maximum value in a case in which, the maximum image height changes with zooming.

19. The zoom lens according to claim 1, wherein the zoom lens satisfies the following conditional expression (15)

$$0.4<f_1/f_3<1.2 \quad (15)$$

where, $f_1$ denotes a focal length of the first lens unit, and
$f_3$ denotes a focal length of the third lens unit.

20. The zoom lens according to claim 1, wherein the zoom lens satisfies the following conditional expression (16)

$$0.45<\Sigma_{2G}/f_2<0.75 \quad (16)$$

where, $\Sigma_{2G}$ denotes a thickness on an optical axis of the second lens unit, and $f_2$ denotes a focal length of the second lens unit.

21. The zoom lens according to claim 1, wherein the zoom lens satisfies the following conditional expression (5)

$$0.6<f_{UN21}/f_2<1.6 \quad (5)$$

where, $f_{UN21}$ denotes a focal length of the object-side sub lens unit in the second lens unit, and $f_2$ denotes a focal length of the second lens unit.

22. The zoom lens according to claim 1, wherein the zoom lens satisfies the following conditional expression (17)

$$3<LTL_W/fb_W<13 \quad (17)$$

where, $LTL_W$ denotes a sum of a distance on an optical axis from a refracting surface of the zoom lens nearest to the object side and a refracting surface of the zoom lens nearest to the image side, of the zoom lens at the time of infinite object point focusing at the wide angle end, and an air-converted back focus, and $fb_W$ denotes the air-converted back focus of the zoom lens at the time of infinite object point focusing on the optical axis at the wide angle end.

23. The zoom lens according to claim 1, wherein the zoom lens satisfies the following conditional expression (19)

$$0.4<\Delta D_{12}/f_T<0.6 \quad (19)$$

where, $$\Delta D_{12}=D_{12W}-D_{12T},$$

$D_{12W}$ denotes the distance between the first lens unit and the second lens unit at the wide angle end, $D_{12T}$ denotes the distance between the first lens unit and the second lens unit at the telephoto end, and $f_T$ denotes a focal length of the overall zoom lens system at the time of infinite object point focusing at the telephoto end.

24. The zoom lens according to claim 1, wherein the zoom lens satisfies the following conditional expression (20)

$$0.73<IH_{39W}/f_W<0.77 \quad (20)$$

where, $IH_{39W}$ denotes a distance from an optical axis, of a position at which a principal light ray for which, a half angle of field on an incidence side of the zoom lens at the time of focusing at infinity on an optical axis at the wide angle end becomes 39°, intersects with a paraxial image plane, and $f_W$ denotes a focal length of the overall zoom lens at the time of infinite object point focusing at the wide angle end.

25. The zoom lens according to claim 1, wherein at the wide angle end, a light ray of a half angle of view 33° or more is capable of passing through the zoom lens, and the zoom lens satisfies the following conditional expression (21)

$$2.6<f_t/f_w<7.0 \quad (21)$$

where, $f_t$ denotes a focal length of the overall zoom lens system at the time of infinite object point focusing at the telephoto end, and $f_w$ denotes a focal length of the overall zoom lens system at the time of infinite object point focusing at the wide angle end.

26. The zoom lens according to claim 1, wherein the second lens unit includes a single lens having a positive refractive power, which is disposed nearest to the object side in the second lens unit, and a cemented lens of a negative lens and a positive lens in order from the object side, and the aperture stop is positioned between the single lens and the cemented lens in the second lens unit.

27. An image pickup apparatus comprising:

a zoom lens; and an image pickup element which has an image pickup surface, and which converts an image formed on the image pickup surface by the zoom lens, to an electric signal, wherein the zoom lens is the zoom lens according to claim 1.

28. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the zoom lens satisfies the following conditional expressions (1) and (2)

$$0.83 < IH_{MAX}/f_W < 1.2 \quad (1)$$

$$-20.0\% < DT_W < -6.0\% \quad (2)$$

where, $IH_{MAX}$ denotes the maximum image height, and denotes the maximum value in a case in which, the maximum image height changes with zooming, $f_W$ denotes a focal length of the overall zoom lens system at the time of infinite object point focusing at the wide angle end, $$DT_W = \{IH_W - f_W \times \tan(\omega_W)\}/\{f_W \times \tan(\omega_W)\} \times 100(\%),$$

$IH_W$ denotes the maximum image height at the time of infinite object point focusing, at the wide angle end, and $\omega_W$ denotes a half angle of view at the time of infinite object point focusing, at the wide angle end.

29. A zoom lens comprising in order from an object side to an image side:

a first lens unit having a negative refractive power;
a second lens unit having a positive refractive power;
a third lens unit having a negative refractive power; and
a fourth lens unit having a positive refractive power, which is disposed on the image side of the third lens unit, wherein at the time of zooming, distances between the lens units change, and a distance between the first lens unit and the second lens unit at a telephoto end is shorter than a distance between the first lens unit and the second lens unit at a wide angle end, and a distance between the third lens unit and the fourth lens unit widens at the telephoto end with respect to a distance between the third lens unit and the fourth lens unit at the wide angle end, and an aperture stop is disposed on the image side of an image-side surface of the first lens unit, and on the object side of an image-side side surface of the second lens unit, and the second lens unit includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path, of the lens component make a contact with air, and the zoom lens satisfies the following conditional expressions (1) and (4)

$$0.83 < IH_{MAX}/f_W < 1.2 \quad (1)$$

$$1.5 < f_{UN21}/ER_S < 3.7 \quad (4)$$

where, $IH_{MAX}$ denotes the maximum image height, and denotes the maximum value in a case in which, the maximum image height changes with zooming, $f_W$ denotes a focal length of the overall zoom lens system at the time of infinite object point focusing at the wide angle end, $ER_S$ denotes the maximum radius of an opening portion of the aperture stop, and $f_{UN21}$ denotes a focal length of the object-side sub lens unit in the second lens unit.

30. The zoom lens according to claim 29, wherein the object-side sub lens unit and the image-side sub lens unit in the second lens unit are disposed such that, an axial air space between the object-side sub lens unit and the image-side sub lens unit is the maximum in the second lens unit.

31. The zoom lens according to claim 30, wherein the image-side sub lens unit in the second lens unit includes one lens component, and only two surfaces of the lens component, namely, the object-side surface and the image-side surface, are in contact with air in the optical path, and the total number of lens components in the second lens unit is two.

32. The zoom lens according to claim 29, wherein the zoom lens satisfies the following conditional expression (18)

$$0.8 < f_{UN21}/f_W < 1.7 \quad (18)$$

where, $f_{UN21}$ denotes a focal length of the object-side sub lens unit in the second lens unit, and $f_W$ denotes a focal length of the overall zoom lens system at the time of infinite object point focusing at the wide angle end.

33. A zoom lens comprising in order from an object side to an image side:

a first lens unit having a negative refractive power;
a second lens unit having a positive refractive power;
a third lens unit having a negative refractive power; and
a fourth lens unit having a positive refractive power, which is disposed on the image side of the third lens unit, wherein at the time of zooming, distances between the lens units change, and a distance between the first lens unit and the second lens unit at a telephoto end is shorter than a distance between the first lens unit and the second lens unit at a wide angle end, and a distance between the third lens unit and the fourth lens unit widens at the telephoto end with respect to a distance between the third lens unit and the fourth lens unit at the wide angle end, and an aperture stop is disposed on the image side of an image-side surface of the first lens unit, and on the object side of an image-side surface of the second lens unit, and the second lens unit includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and the object-side sub lens unit in the second lens unit includes one lens component, and only two surfaces namely, an object-side surface and an image-side surface in an optical path, of the lens component make a contact with air, and the image-side sub lens unit in the second lens unit includes a lens surface having a negative refractive power and a positive lens which is disposed on the image side of the lens surface, and the first lens unit includes in order from the object side to the image side, an object-side sub lens unit which includes a first negative lens, and an image-side sub lens unit which includes a second negative lens and a first positive lens, and the zoom lens satisfies the following conditional expressions (5) and (6)

$$0.6 < f_{UN21}/f_2 < 1.6 \quad (5)$$

$$1.15 < |f_3/f_w| < 2.5 \quad (6)$$

where, $f_{UN21}$ denotes a focal length of the object-side sub lens unit in the second lens unit, $f_2$ denotes a focal length of the second lens unit, $f_3$ denotes a focal length of the third lens unit, and $f_W$ denotes a focal length of the overall zoom lens system at the time of infinite object point focusing at the wide angle end.

34. A zoom lens comprising in order from an object side to an image side:
  a first lens unit having a negative refractive power;
  a second lens unit having a positive refractive power;
  a third lens unit having a negative refractive power; and
  a fourth lens unit having a positive refractive power, which is disposed on the image side of the third lens unit, wherein
  at the time of zooming, distances between the lens units change, and
  a distance between the first lens unit and the second lens unit at a telephoto end is shorter than a distance between the first lens unit and the second lens unit at a wide angle end, and
  a distance between the third lens unit and the fourth lens unit widens at the telephoto end with respect to a distance between the third lens unit and the fourth lens unit at the wide angle end, and
  an aperture stop is disposed on the image side of an image-side surface of the first lens unit, and on the object side of an image-side surface of the second lens unit, and
  the second lens unit includes two sub lens units namely, an object-side sub lens unit having a positive refractive power, which is a lens unit disposed nearest to the object side in the second lens unit, and an image-side sub lens unit which is disposed on the image side of the object-side sub lens unit in the second lens unit, and
  the object-side sub lens unit in the second lens unit includes one lens component, and
  only two surfaces namely, an object-side surface and an image-side surface in an optical path, of the lens component make a contact with air, and
  the image-side sub lens unit in the second lens unit includes a lens surface having a negative refractive power, and a positive lens which is disposed on the image side of the lens surface, and
  the first lens unit includes in order from the object side to the image side, an object-side sub lens unit which includes a first negative lens, and an image-side sub lens unit which includes a second negative lens and a first positive lens, and
  the zoom lens satisfies the following conditional expressions (5) and (7)

$$0.6 < f_{UN21}/f_2 < 1.6 \quad (5)$$

$$1.6 < |f_3/IH_{39w}| < 3.9 \quad (7)$$

where, $f_{UN21}$ denotes a focal length of the object-side sub lens unit in the second lens unit, $f_2$ denotes a focal length of the second lens unit, $f_3$ denotes a focal length of the third lens unit, and $IH_{39W}$ denotes a distance from an optical axis, of a position at which a principal light ray for which, a half angle of field on an incidence side of the zoom lens at the time of focusing at infinity on an optical axis at the wide angle end becomes 39°, intersects with a paraxial image plane.

* * * * *